US012787082B2

(12) United States Patent
Xie et al.

(10) Patent No.: US 12,787,082 B2
(45) Date of Patent: Nov. 3, 2026

(54) BLUETOOTH LOW ENERGY PHY DETECTION AND SWITCH

(71) Applicant: Avago Technologies International Sales Pte. Limited, Singapore (SG)

(72) Inventors: Guoxin Xie, Rancho Santa Fe, CA (US); Shawn Shiliang Ding, San Diego, CA (US); Joby Paily Aliyath, San Ramon, CA (US); Kuang-Ying Hsi, San Diego, CA (US); Vincent Roussel, Irvine, CA (US); Yuan Zhuang, Rancho Santa Fe, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 412 days.

(21) Appl. No.: 18/457,328

(22) Filed: Aug. 28, 2023

(65) Prior Publication Data

US 2025/0081261 A1 Mar. 6, 2025

(51) Int. Cl.
*H04W 76/14* (2018.01)
*H04W 76/15* (2018.01)

(52) U.S. Cl.
CPC ........... *H04W 76/14* (2018.02); *H04W 76/15* (2018.02)

(58) Field of Classification Search
CPC . H04W 76/14; H04W 76/15; H04W 72/0446; H04W 72/1268; H04W 72/23; H04W 72/044; H04W 72/126; H04L 5/0051; H04L 5/0023; H04L 5/005
See application file for complete search history.

(56) References Cited

U.S. PATENT DOCUMENTS

2018/0159679 A1 6/2018 de Ruijter et al.
2021/0168779 A1* 6/2021 Mondal ................. H04L 5/0053
2021/0242894 A1 8/2021 de Ruijter
2024/0129699 A1* 4/2024 Kumar ................. H04R 1/1041
2025/0038831 A1* 1/2025 Cao ................... H04W 56/0015

OTHER PUBLICATIONS

Extended European Search Report, European Application No. 24196709.0 dated Jan. 29, 2025, 9 pages.

* cited by examiner

*Primary Examiner* — Wei Zhao
(74) *Attorney, Agent, or Firm* — King Intellectual Asset Management

(57) ABSTRACT

Techniques for performing automatic PHY updates in Bluetooth devices. In some cases, a device might detect the reception of a packet sent with a particular PHY and automatically update the device's physical layer to employ that PHY for receiving and/or transmitting subsequent packets.

20 Claims, 18 Drawing Sheets

600a

600b

600c

BLUETOOTH LOW ENERGY PHY DETECTION AND SWITCH

TECHNICAL FIELD

This disclosure relates generally to wireless networking, and more specifically, to Bluetooth communications between a central device and peripheral devices.

BACKGROUND

The Bluetooth® Core Specification (BCS) v.5.3 defines a low energy standard (Bluetooth LE or BLE) and establishes a relationship between a central device and one or more peripheral devices (also referred to as "peripherals"), in which the central device can establish connections with one or more peripheral devices. The BCS defines a stack of layers starting at the physical layer (which includes the radio frequency (RF) system and the hardware interfacing with the RF system) to the application layer (which includes user application that employ Bluetooth communications, such as music player applications, etc.). The BCS defines several different configurations of the physical layer, each of which is known as a PHY.

In particular, with respect to BLE, the BCS defines a LE 1M PHY, a LE 2M PHY, and a LE Coded PHY. The LE 1M PHY provides a symbol rate of 1 million symbols per second (equivalent to 1 Mb/s), while the LE 2M PHY provides a symbol rate of 2 million symbols per second (equivalent to 2 Mb/s), allowing higher application data rates than LE 1M, but at a greater risk of symbol interference, which reduces the effective range somewhat. The LM Coded PHY provides a symbol rate of 1 million symbols per second but employs forward error correction to allow significantly longer range than LE 1M; this coding reduces the application data rate to either 500 Kb/s or 125 Kb/s, depending on the coding scheme employed.

Bluetooth devices transmit data in protocol data units (PDU), which represent the smallest unit of data that the Bluetooth protocol can carry. (The terms PDU and "packet" are often used interchangeably). PDUs can include various types of data, such as control information, user data, headers, and other information for proper communication. In general, PDUs are used to organize and encapsulate data for transmission within the Bluetooth protocol. There are several types of PDUs used by BLE, including without limitation advertising PDUs, which are used to broadcast information about a device's presence and capabilities to other devices; data PDUs, which carry substantive data, such as user information or application-specific data; control PDUs, which include control and management information for establishing, maintaining, and terminating BLE connections, and response PDUs, which are used to respond to specific requests or commands in the Bluetooth protocol.

Bluetooth devices are designed to use the most advantageous PHY in each situation. For example, if a central device and the peripheral are in a connection state using the LE 1M PHY, and the range between them grows to the point where symbol errors impede transmission, the devices likely will attempt to update the PHY to the LE Coded PHY; conversely, if the range is short and interference is minimal, the devices likely will attempt to update the PHY to the LE 2M PHY.

As described in further detail below, the PHY update technique provided by the standard is cumbersome, and it has a few disadvantages. First, this technique requires the transmission of more PDUs (and therefore a longer time) than necessary for both devices to update to the desired PHY. In addition to wasted bandwidth, this delay is disadvantageous because the fact that one of the devices has decided to update the PHY means that the current PHY is not performing optimally, and it would be best to correct this situation as soon as possible. Moreover, this technique presents a risk of disconnection; for example, if the peripheral does not receive the update packet after the central device already has updated, the devices will lose connection. Further, if the PHY update transitions from a longer range PHY (e.g., LE Coded) to a shorter range PHY (e.g., LE 2M), the change in sensitivity might cause the connection to lose synchronization, resulting in eventual disconnection. Additionally, the excess communications required by this procedure is not an efficient use of bandwidth or airtime.

Prior to establishing a connection, Bluetooth LE employs a scan/advertise model, in which advertisers (generally peripherals) send advertisement PDUs on a fixed interval (the Advertising Interval). The BLE standard does not allow the LE 2M PHY to be used on the primary advertising channels (2402 MHZ, 2426 MHz, and 2480 MHz). The LE 2M PHY is allowed only in the secondary advertising channels (2402 MHz to 2480 MHz), which must be specified by the payload of the primary advertising packet. This requires additional, unnecessary PDUs to establish the secondary advertising channel.

Collectively, these issues create inefficiencies in airtime use and bandwidth, which wastes device power and degrades the user experience. There is a need for new techniques that address some or all of these issues.

DETAILED DESCRIPTION

Various embodiments PHY update techniques for Bluetooth LE devices. As used herein, the term "PHY" means any particular configuration of a Bluetooth device's physical layer. Examples of PHYS include, but are not limited to, the LE 1M, L2 2M, and LE Coded PHYs, as well as additional PHYs to be developed, such as those being developed by the Bluetooth Higher Data Throughput project (generally referred to herein as a high data rate PHY).

In an aspect of some embodiments, when a central device and a peripheral device are connected (i.e., in a "connection state"), the transmitting device (which may be the central device or a peripheral device in some embodiments) transmits a packet using a desired PHY. The receiving device (which also can be the central device or a peripheral device in some embodiments) might employ multiple physical layer blocks configured with different PHYs. In an aspect, the device might enable those physical layer blocks to operate simultaneously in parallel. The device might also enable multiple receivers, including a receiver in communication with each of the physical layer blocks. When the device detects the packet with one of the physical layer blocks (e.g., the physical layer block configured with the same PHY as the packet), the device might update to the PHY of that physical layer block.

As described below, some embodiments advantageously allow for more efficient PHY updates, reducing the use of airtime and bandwidth, reducing the risk of a lost connection, and/or increasing user satisfaction. In some embodiments, the PHY update technique can allow the use of LE 2M advertising packets on a primary advertising channel, because the advertiser (e.g., a peripheral) and scanner (e.g., a central device) can automatically switch PHYs as needed.

Figure 1:
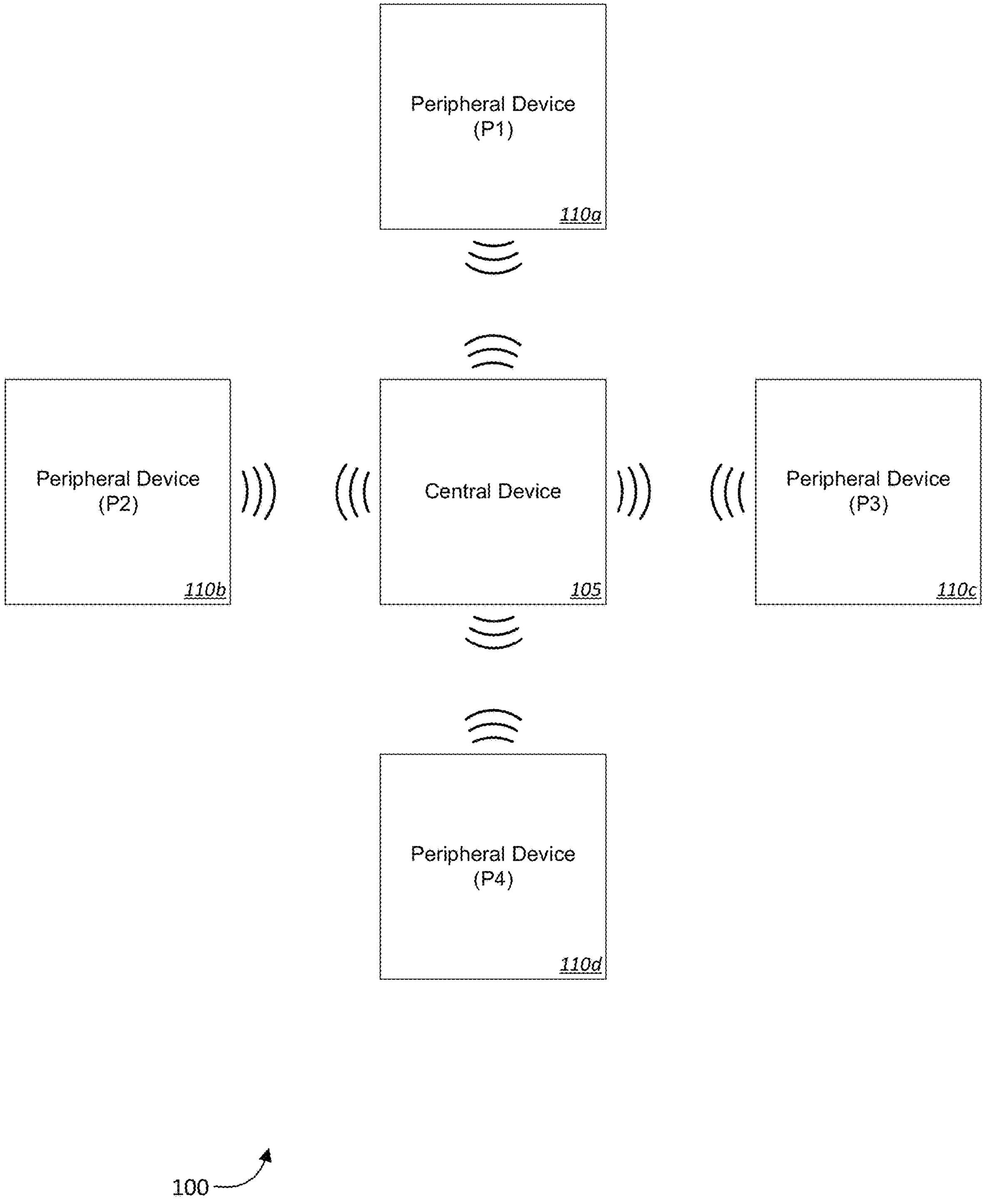
FIG. 1 is a block diagram illustrating a Bluetooth LE group comprising a central device and plurality of peripheral devices, in accordance with some embodiments.

FIG. 1 illustrates a system 100 comprising a central device 105 and a plurality of peripheral devices 110. While FIG. 1 illustrates four peripherals 110, various embodiments can comprise as many peripherals 110 as the central device 105 can support. As used herein, the term "central device" means a device performing the role of a central device (also known as a master device) that performs the Central Role when two devices are in a connection state, according to the BCS. Non-limiting examples of such devices can include personal computers, wireless phones, tablet computers, smart watches, and the like. Similarly, the term "peripheral device" means a device performing the Peripheral role according to the BCS. Non-limiting examples of such devices include sensors (temperature sensors, heart rate sensors, etc.), IoT devices (thermostats, doorbells, cameras, and/or the like), audio devices (headphones, speakers, etc.) and the like. In the advertising and scanning states, a "scanner" is the device (typically a central device) that scans for advertisements and an "advertiser" (typically a peripheral) transmits advertisements. In the initiating state, the scanner becomes an "initiator," which initiates a connection to an advertiser. (These exemplary roles are not limiting, and in accordance with some embodiments, any device can perform any suitable role). In some embodiments, a single device can be a central device in some circumstances and a peripheral device in other circumstances. For instance, modern versions of the Apple Iphone® can operate as either a central device or a peripheral device.

Figure 2:
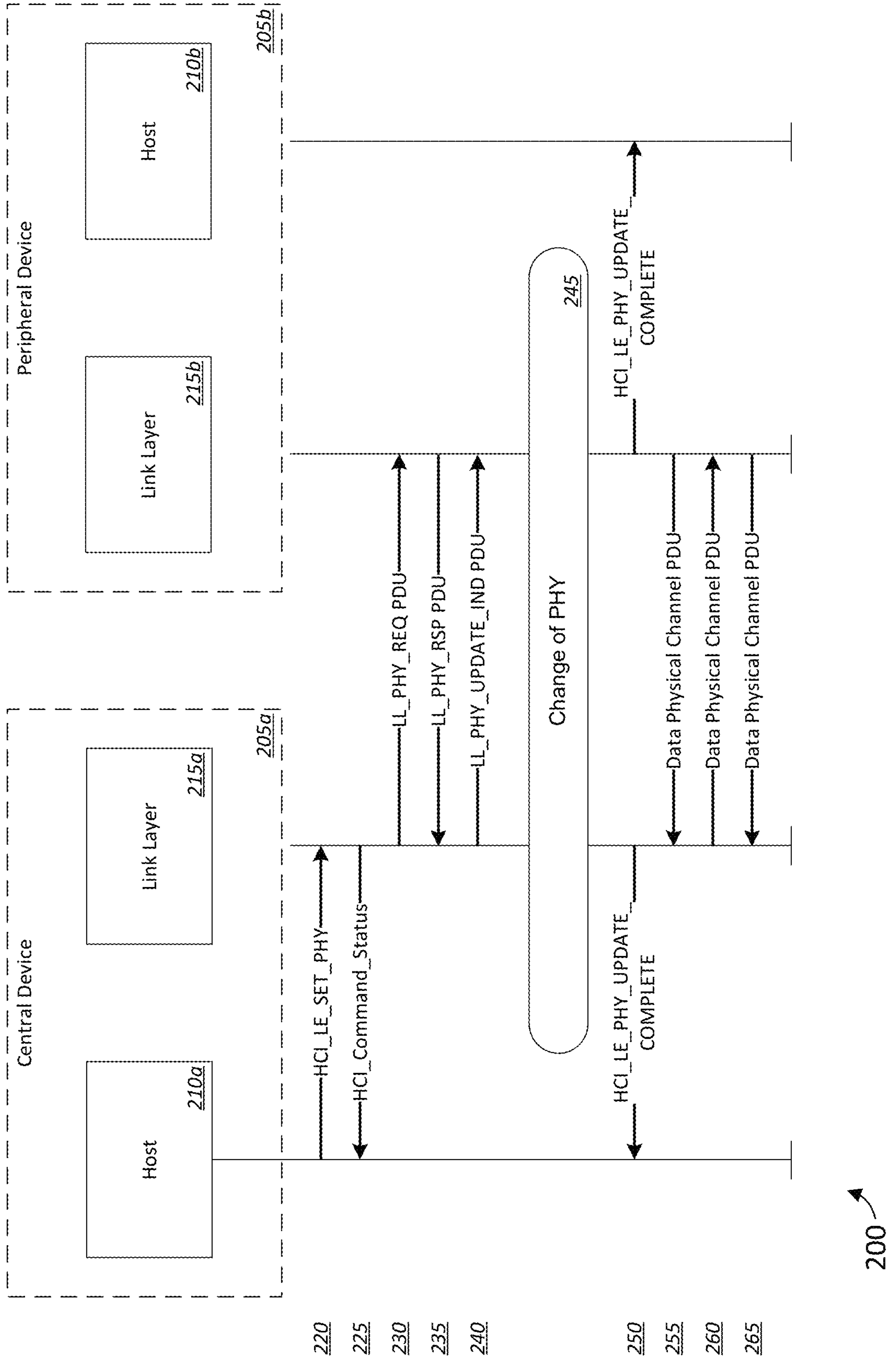
FIG. 2 is a timing diagram illustrating communications involved in the existing PHY update process.
Figure 3:
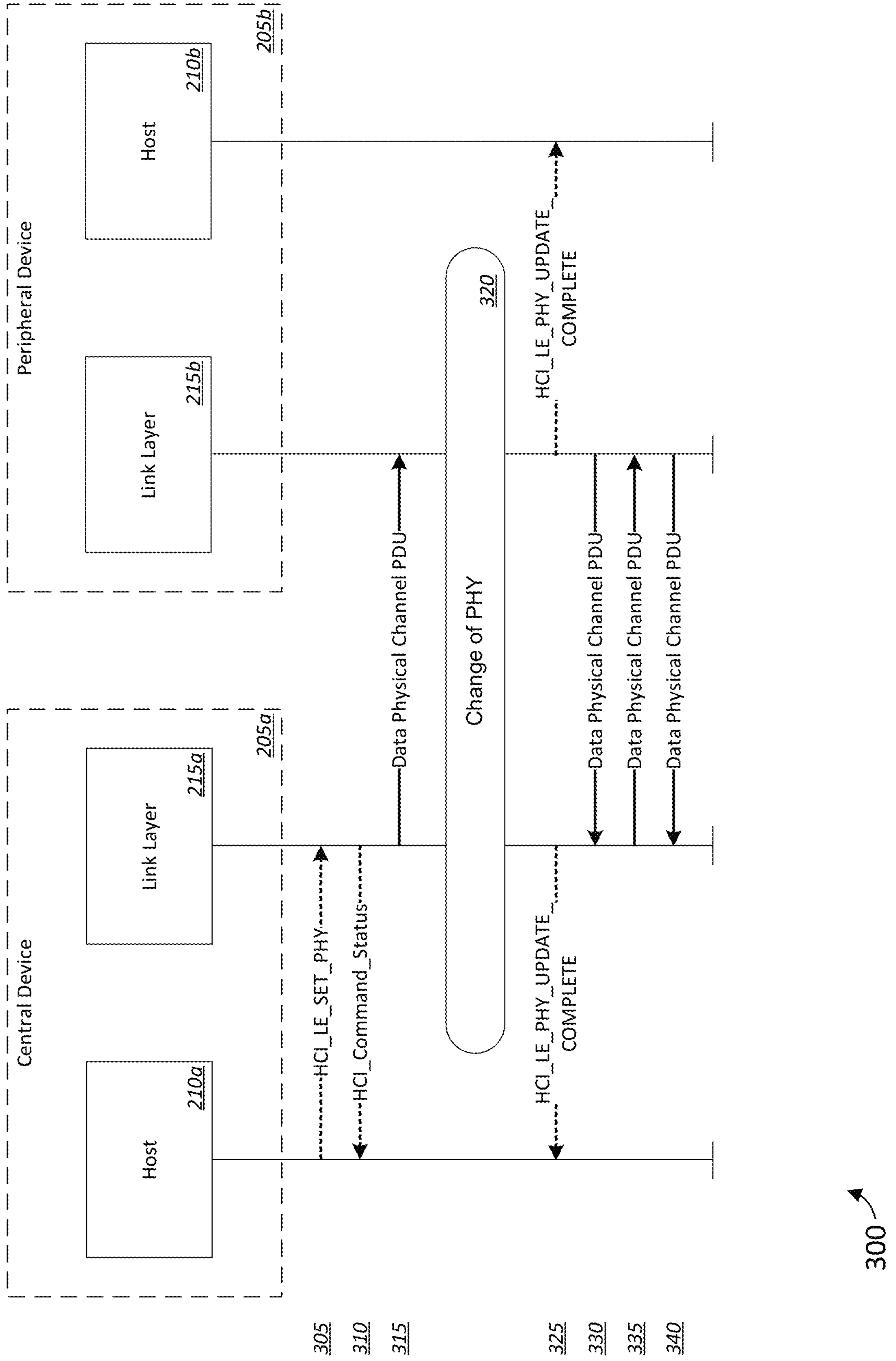
FIG. 3 is a timing diagram illustrating communications involved in a PHY update process according to various embodiments.

As noted above, some embodiments can make the PHY update process more efficient. To illustrate the benefits of some embodiments, FIG. 2 is a timing diagram illustrating communications involved in the existing PHY update process 200 between a central device 205*a* and a peripheral 205*b*, while FIG. 3 is a timing diagram of the PHY update process 300 provided by some embodiments. In both processes 200, 300, each device 205 comprises a host 210 and a link layer 215, which generally are connected with a host controller interface (HCI).

In FIG. 2, the process 200 is initiated by the central device host 210*a* sending a HCI_LE_SET_PHY command to the link layer 215*a* (event 220), which the link layer 215*a* confirms with a HCI_Command_Status message sent back to the host 205*a* (event 225). The link layer 215*a* then transmits a protocol data unit (PDU) called the LL_PHY_REQ PDU to the peripheral link layer 210*b* indicating the transmit and receive PHYs the central device 205*a* would like to use (event 230). In response, the peripheral link layer 215*b* transmits a LL_PHY_RSP PDU (event 235) with the same information for the peripheral's preferences. The central link layer 215 then transmits a LL_PHY_UPDATE_IND PDU (event 240) indicating which PHY will be used in each direction as well as the Instant the update will be made. The BCS uses the term "Instant" to refer to a precise point in time that a scheduled event will occur. In many cases, the Instant is defined as a certain number of connection events until the event. With regard to PHY updates, the BCS requires at least six connection events after the transmission of the LL_PHY_UPDATE_IND PDU before an Instant occurs. Once that Instant occurs, the PHY is updated on the link layer 215 of each device 205 (event 245) and each link layer 215 transmits a HCI_LE_PHY_UPDATE_COMPLETE message (event 250) to inform its respective host 210 that the PHY update process has completed. From that point, the devices 205 will transmit data PDUs using the new PHY settings (events 255-265). All in all, the process generally will require at least three link layer control protocol (LLCP) messages (e.g., events 220, 225, and 250), three command PDUs (e.g., events 230-240), plus six additional connection events (the minimum required by the Instant).

As noted, some embodiments employ the process 300 of FIG. 3 to perform a PHY update. This process 300 is more efficient than the process 200 illustrated in FIG. 2. As described above, the method 300 can begin with the central device host 210*a* sending a HCI_LE_SET_PHY command to the link layer 215*a* (event 305)—confirmed by a HCI_Command_Status message (event 310)—and end with HCI_LE_PHY_UPDATE_COMPLETE message (event 325). Between those events, however, the process 300 requires only a single PDU (which can be a data PDU) to be sent from the central device to the peripheral (event 315), at which point the PHY is updated automatically by each link layer 115, e.g., using the operations described below. At most, this procedure requires three LLCP messages at the central device (events 305, 310, 320) and a single PDU (event 315), which can be a data PDU. Moreover, as described further below, in some embodiments, the entire PHY update can occur at the link layer 215 without involving the host 210, and in such embodiments, the LLCP messages are not required at all. This process provides a more efficient use of airtime and bandwidth than the process 200 of FIG. 2.

Figure 4:
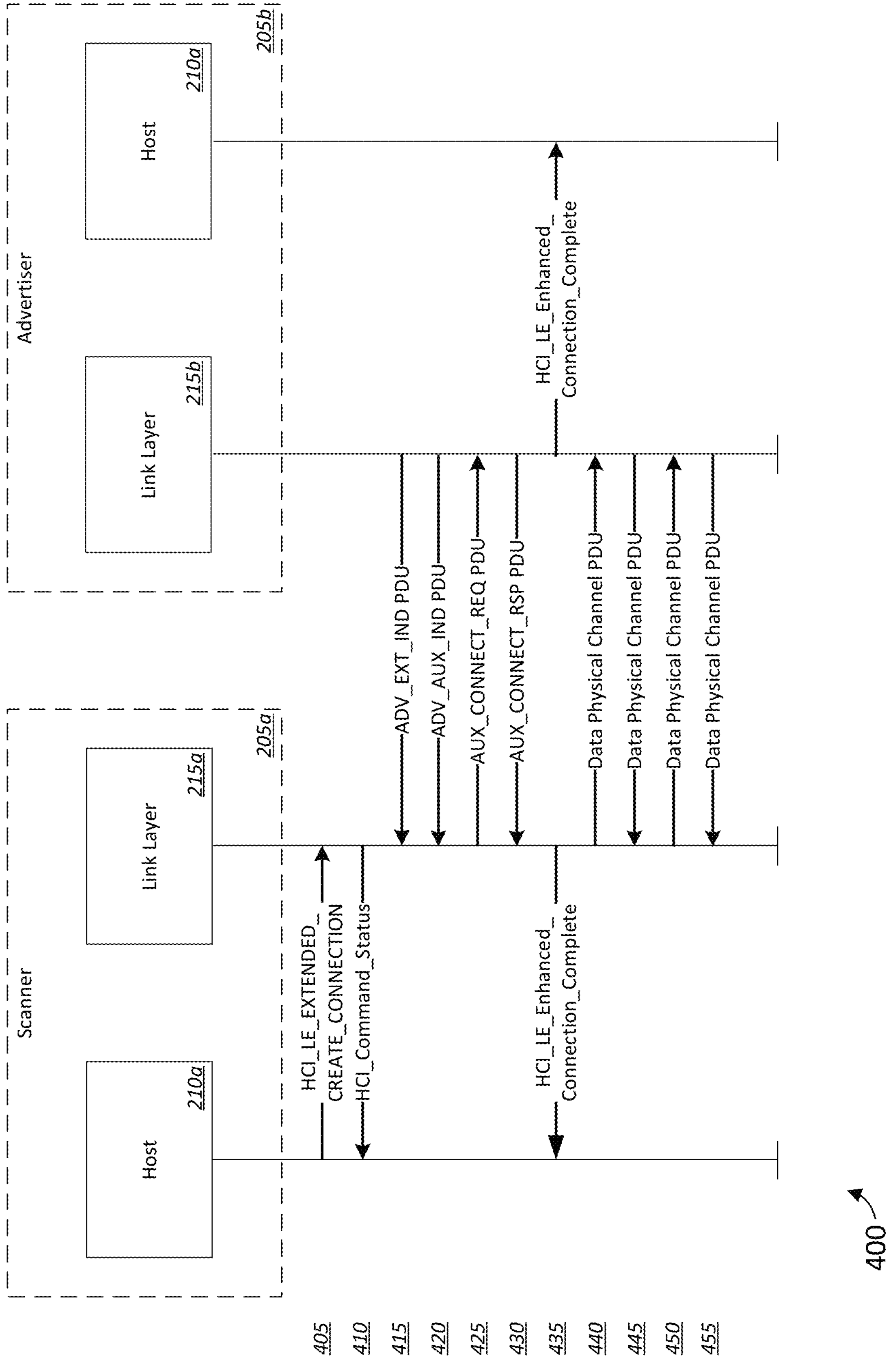
FIG. 4 is a timing diagram illustrating the communications involved in the existing LE 2M advertising process.
Figure 5:
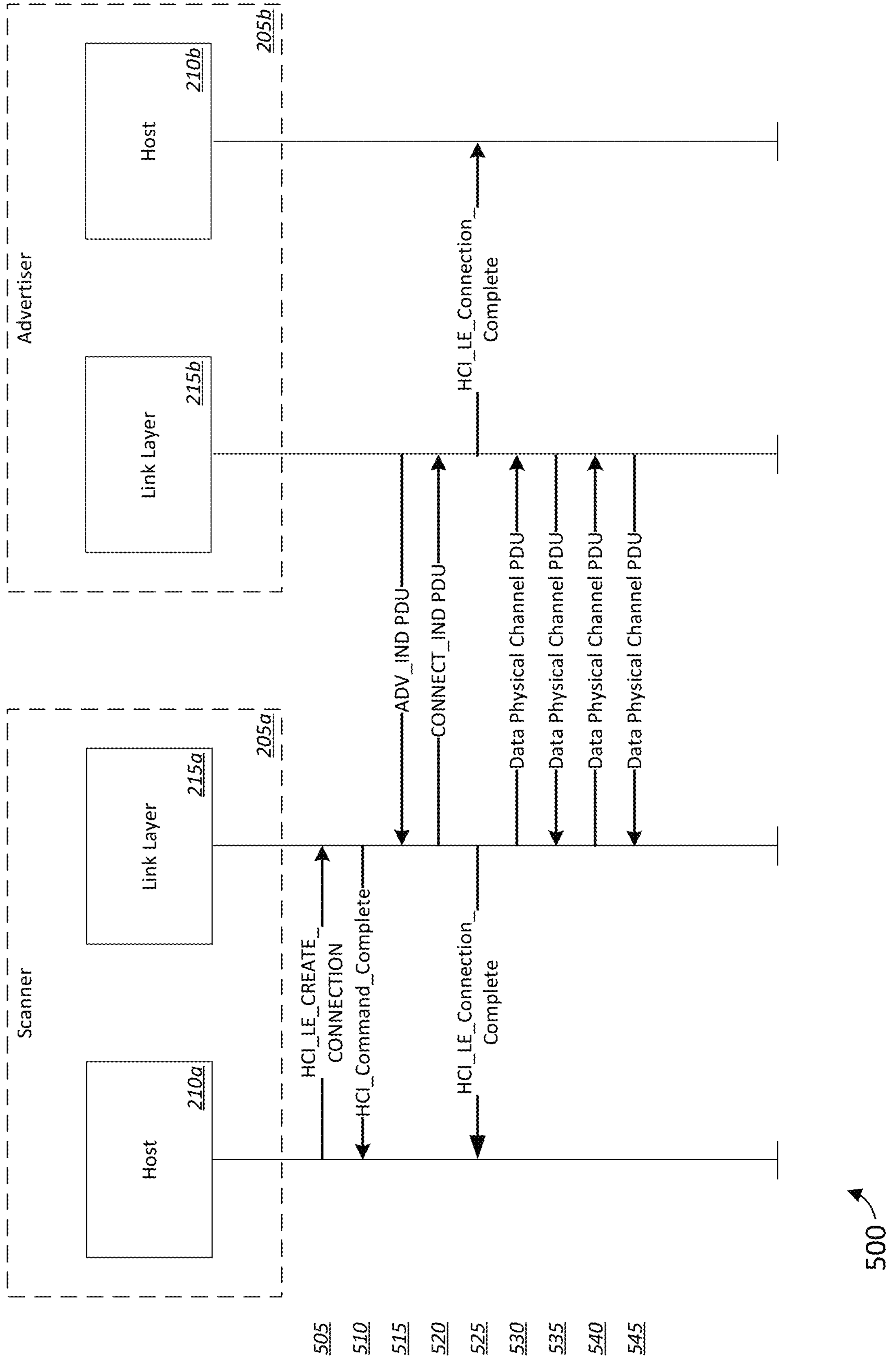
FIG. 5 is a timing diagram illustrating the communications involved in a LE 2M advertising process according to various embodiments.

Some embodiments can enable LE 2M advertising over primary channels as well. To illustrate some aspects of this feature, FIG. 4 is a timing diagram depicting the existing process 400 to use LE 2M for advertising, and FIG. 5 is a timing diagram illustrating a process 500 according to some embodiments. As noted, the current BCS does not support LE 2M advertising on the primary advertising channels, so any LE 2M advertising must be done on a secondary advertising channel. The process 400 involves communications between a scanner 205*a* (which might be a central device) and an advertiser 205*b* (which might be a peripheral device). First, the scanner host 210*a* sends a HCI_LE_EXTENDED_CREATE_CONNECTION message to the link layer 215*a* (event 405), which includes, inter alia, a field instructing the link layer 210*a* the PHY with which to make the connection. This is confirmed by a HCI_Command_Status message (block 410), Meanwhile, the advertiser link layer 215*b* transmits ADV_EXT_IND PDUs (event 415) followed by ADV_AUX_IND PDUs (event 420) until the central link layer 215*a* responds with an AUX_CONNECT_REQ PDU (event 425) to request a connection. Each ADV_EXT_IND PDU includes an AuxPtr field indicating the secondary advertising channel and PHY that will be used for the following ADV_AUX_IND PDU. The AUX_CONNECT_REQ PDU is sent by the scanner link layer 215*a* on the same secondary advertising channel specified by the ADV_AUX_IND PDU. After receiving the connection request, the advertiser link layer 215*b* sends an AUX_CONNECTION_RSP PDU (event 435), after which each link layer 215 sends a HCI_LE_Enhanced_Connection_Complete message to its respective host 210 (event 435) and the devices enter connection state, at which point data PDUS can be exchanged (events 440-455).

FIG. 5 illustrates an exemplary process 500, which, in some embodiments, enables LE 2M advertising on a primary advertising channel. The process 500 begins with the scanner host (and/or, in initiating state, the initiator host) 210*a* sending a HCI_LE_CREATE_CONNECTION message to the link layer 215*a* (event 505). In contrast to the typical process 400, this process 500 does not require the host 210*a* to command the link layer 215*a* using the HCI_LE_EXTENDED_CREATE_CONNECTION message, because host 210*a* does not need to specify a PHY with which to make the connection, and the link layer 215*a* does not need to listen on a secondary advertising channel. (In some embodiments, however, the HCI_LE_EXTENDED_CREATE_CONNECTION can still be used.)

The advertiser link layer 215*b* transmits an ADV_IND PDU (or, alternatively, an ADV_DIRECT_INV PDU) on a primary advertising channel (event 515). The initiator link layer 215*a* then sends the CONNECT_IND PDU (event 520) using the same PHY as it received (in this case, LE 2M). Each link layer 215 sends a HCI_LE_Connection_Complete messages to its respective host 210 (event 525), and the devices enter connection state with LE 2M as the active PHY. At this point, data packets can be exchanged (events 530-545). The difference between this process 500 and the process 400 of FIG. 4 is the automatic PHY update can, in some embodiments, eliminate the need for the extended advertising procedure. More specifically, in some embodiments, the ADV_IND PDU (event 515) can be sent using LE 2M, and the initiator link layer 215*a* can perform an automatic PHY update (e.g., using the procedures discussed below) before sending the CONNECT_IND PDU (event 520) (also using LE 2M). Additionally and/or alternatively, if the advertiser link layer 215*b* transmits the ADV_IND PDU using LE 1M, and if the scanner 205*a* wants to use LE 2M to start connection mode, the scanner link layer 215*b* can transmit the CONNECT_IND PDU using LE 2M, and the advertiser link layer 215*b* can perform an automatic PHY update.

As this example shows, in some embodiments, a device can perform the automatic PHY update, not only in a connection state but also in other states, for example, whenever receiving a PDU, e.g., any advertising PDU, scanning PDU, and/or initiating PDU. As used herein the term "advertising PDU" includes without limitation those defined by BCS Vol 6, Part B (ADV_IND, ADV_DIRECT_IND, ADV_NONCONN_IND, ADV_SCAN_IND, ADV_EXT_IND, AUX_ADV_IND, AUX_SYNC_IND, and AUX_CHAIN_IND) as well as any other PDUs sent by a device in an advertising state. Similarly, the term "scanning PDU" includes without limitation those defined by BCS Vol 6, Part B (SCAN_REQ, SCAN_RSP, AUX_SCAN_REQ, AUX_SCAN_RSP) as well as any other PDUs or packets sent by a device in the scanning state. The term "initiating PDU" includes without limitation those defined by BCS Vol 6, Part B (CONNECT_IND, AUX_CONNECT_REQ, AUX_CONNECT_RSP), as well as any other PDUs or packets sent by a device in the initiating state. Thus, in some embodiments, the automatic PHY update procedures described herein are not limited to devices in the connecting state.

Figure 6A:
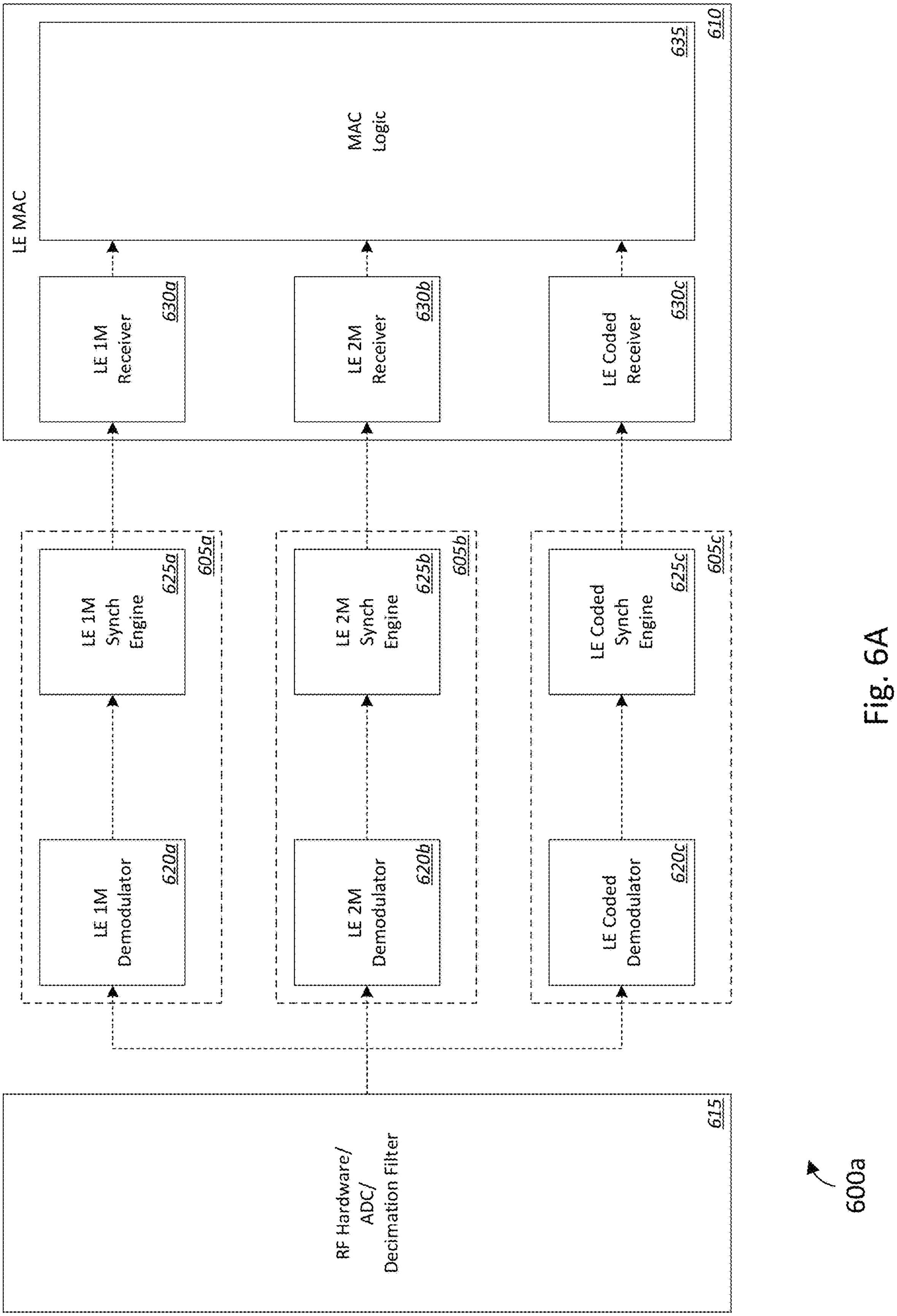
FIG. 6A is a block diagram illustrating particular components of a Bluetooth device in accordance with various embodiments.
Figure 6B:
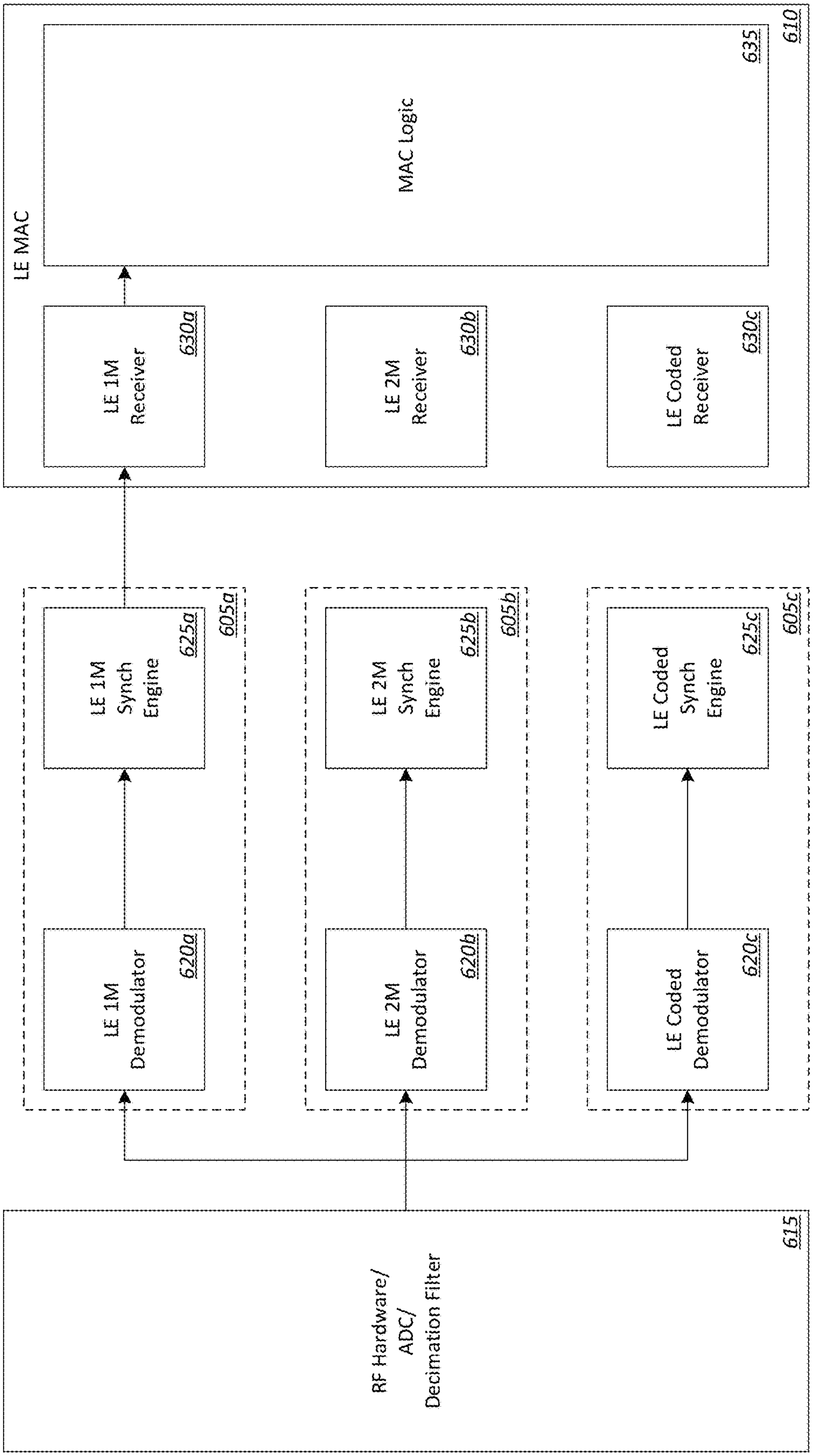
FIGS. 6B-6G are block diagrams illustrating the operation of a Bluetooth device in accordance with various embodiments.
Figure 6C:
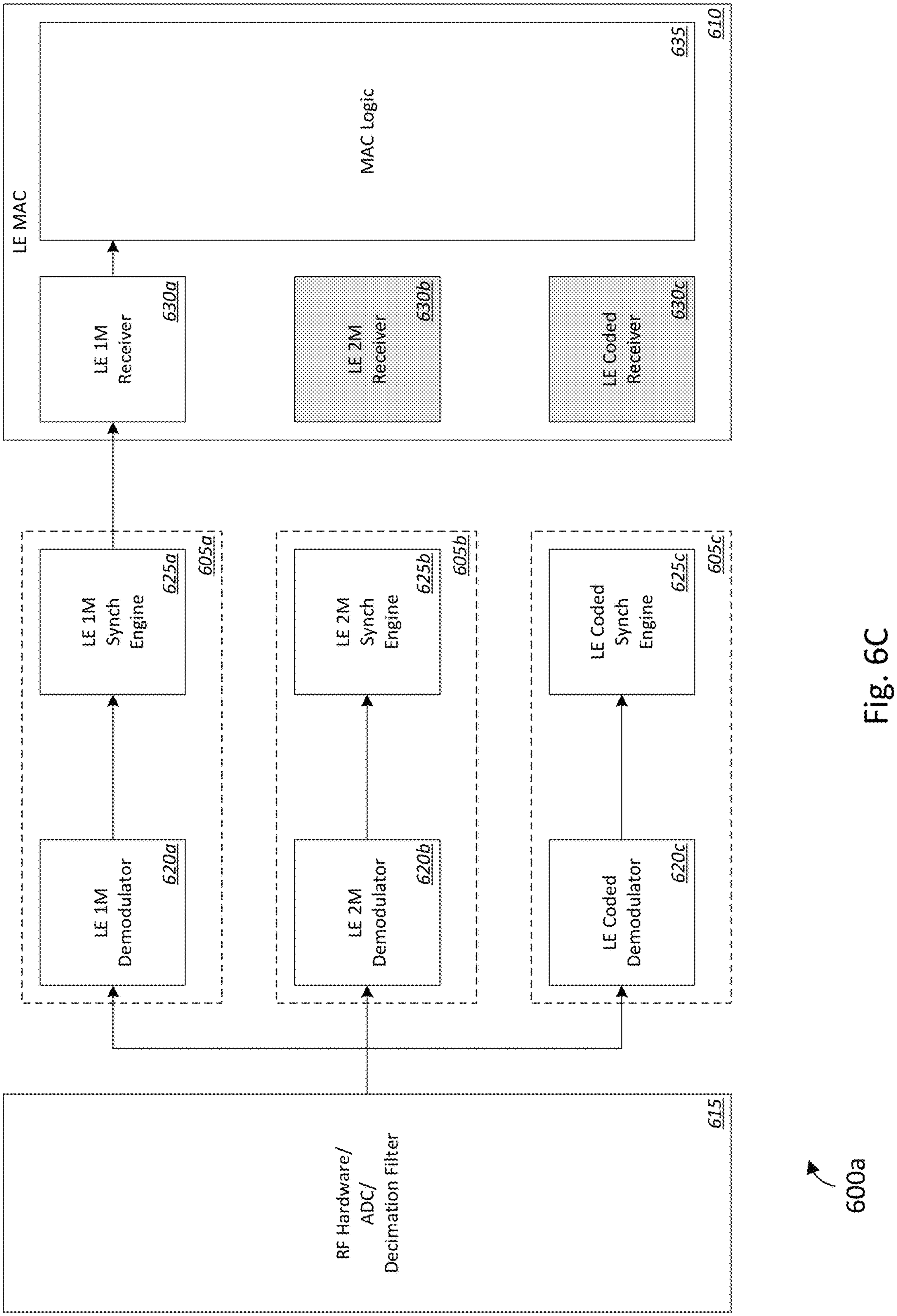
Figure 6D:
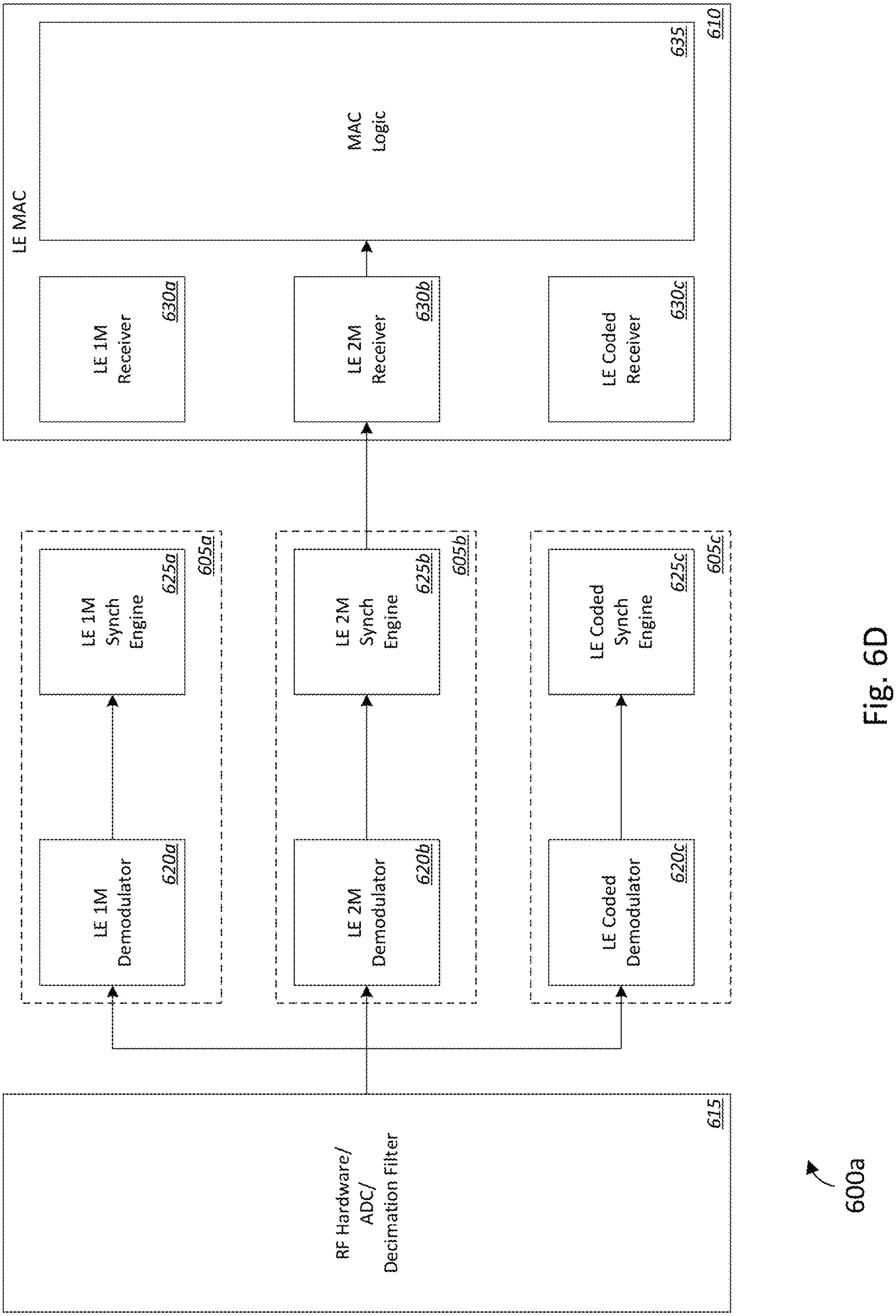
Figure 6E:
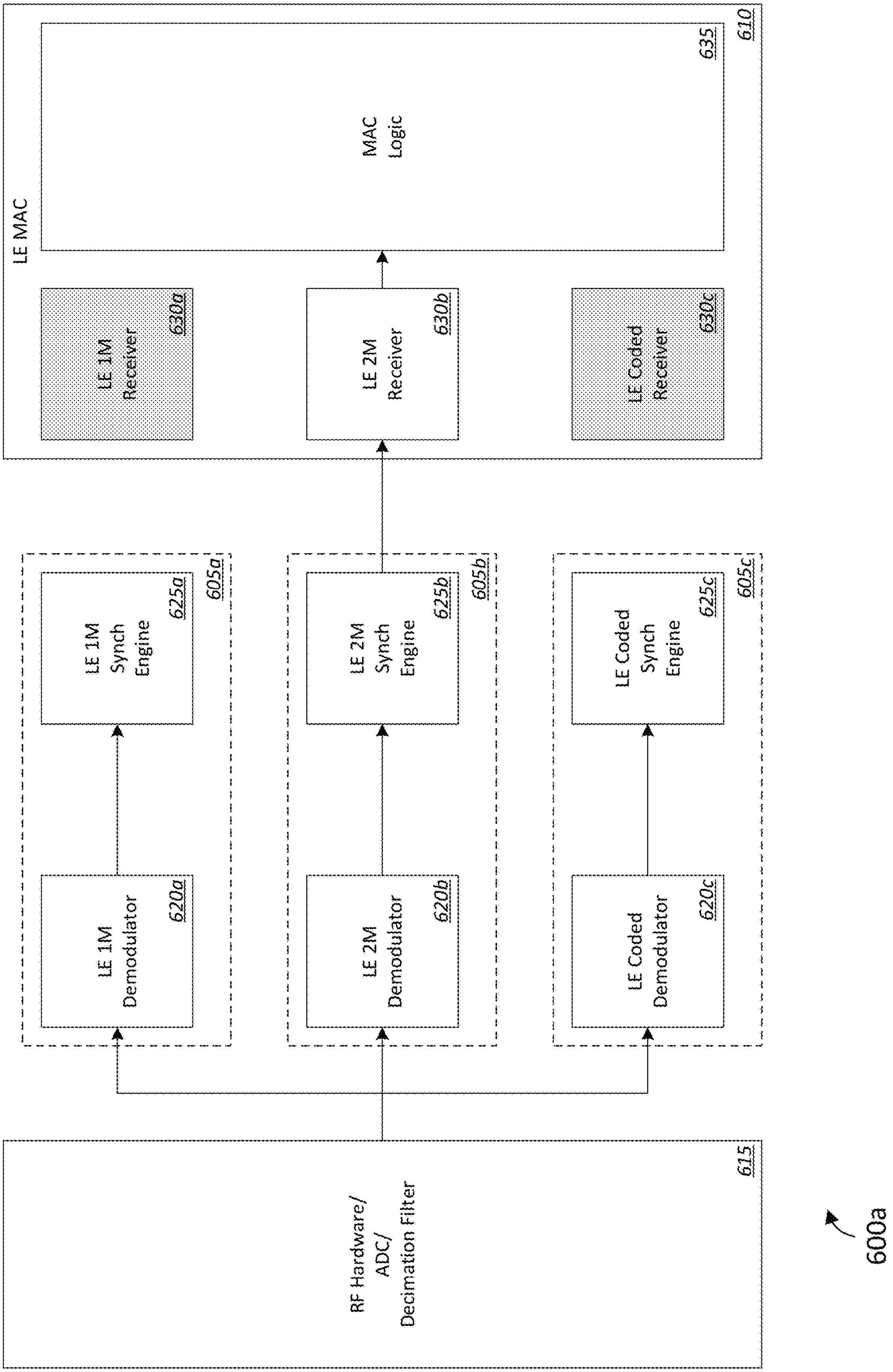
Figure 6F:
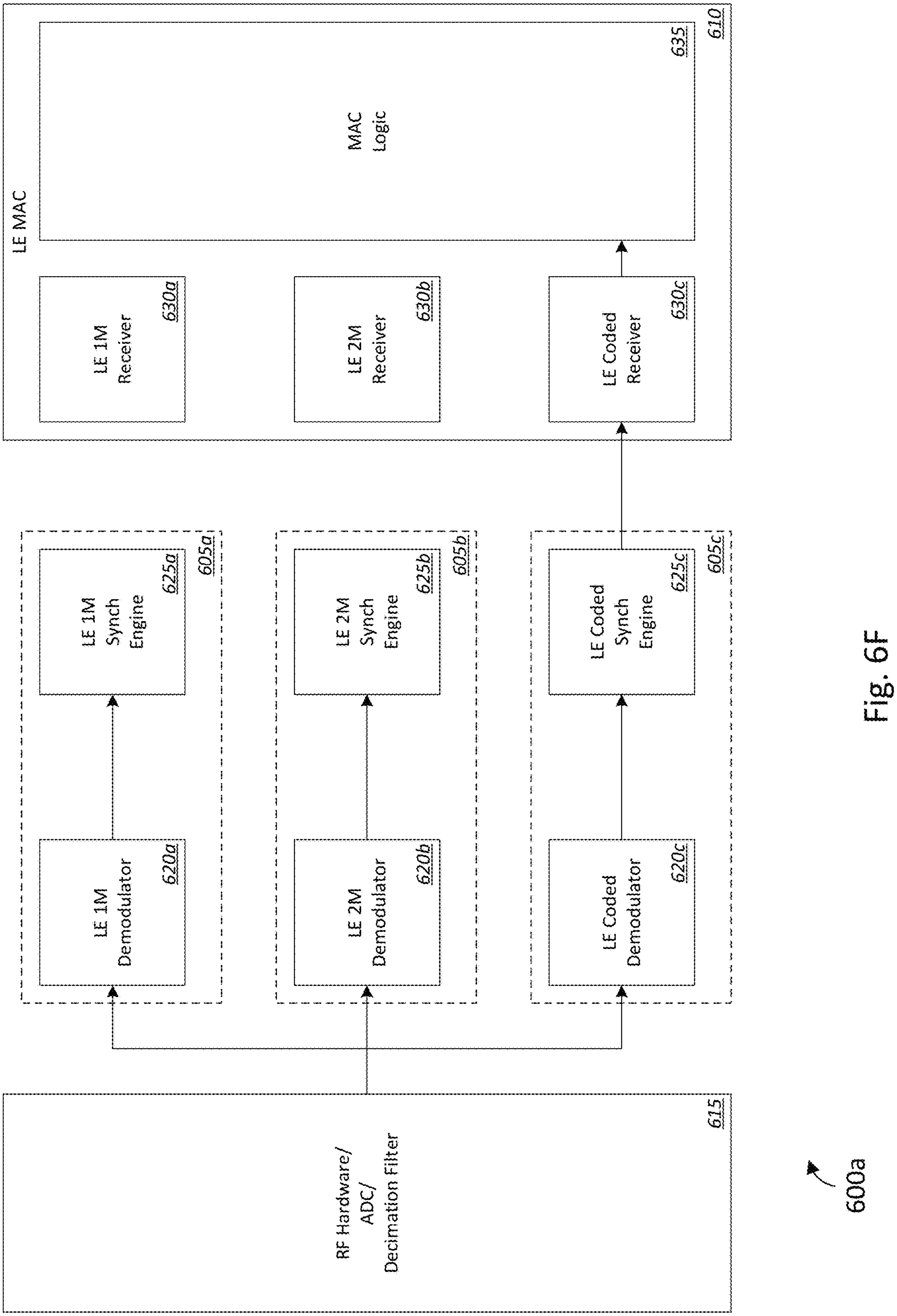
Figure 6G:
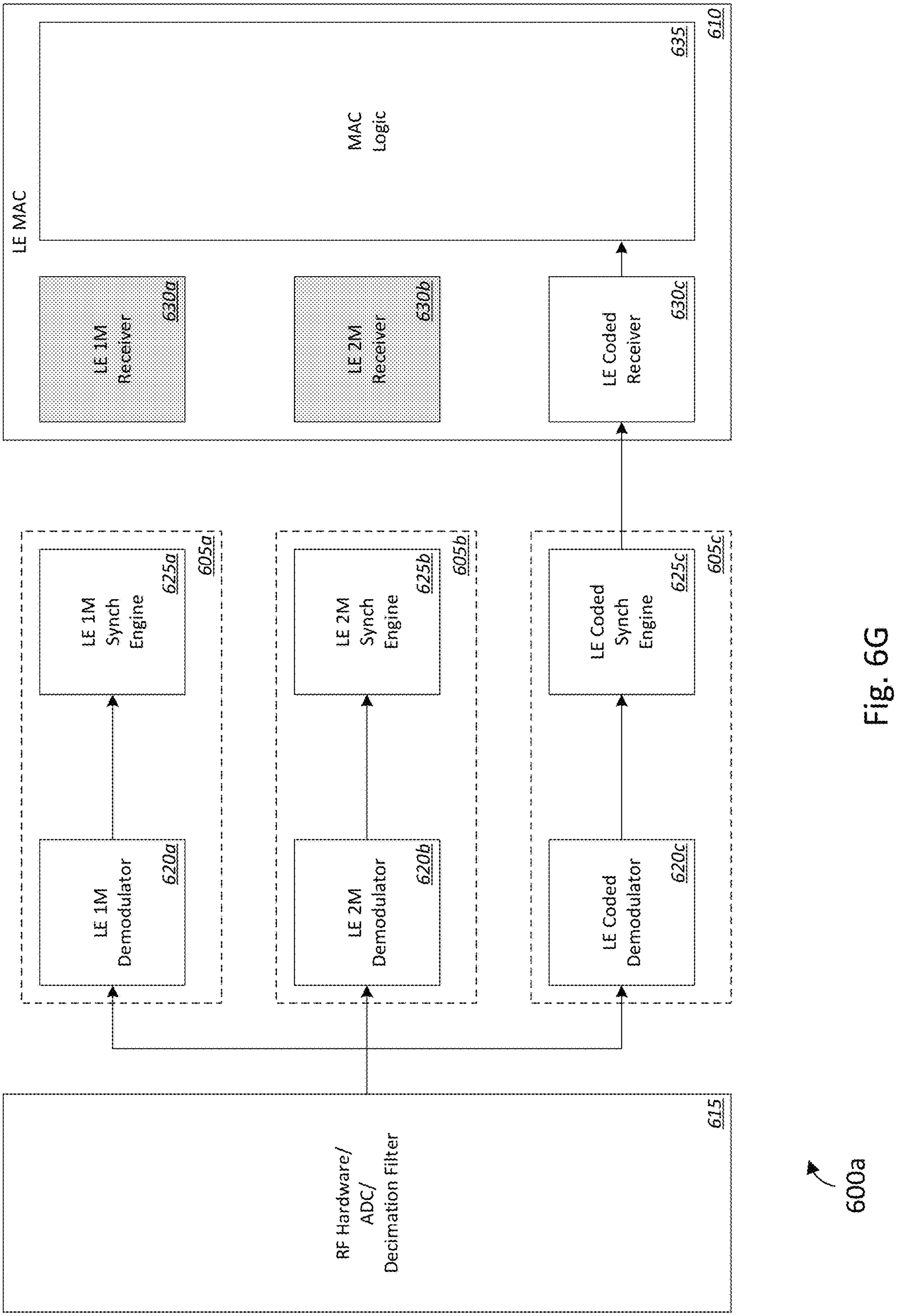
Figure 6H:
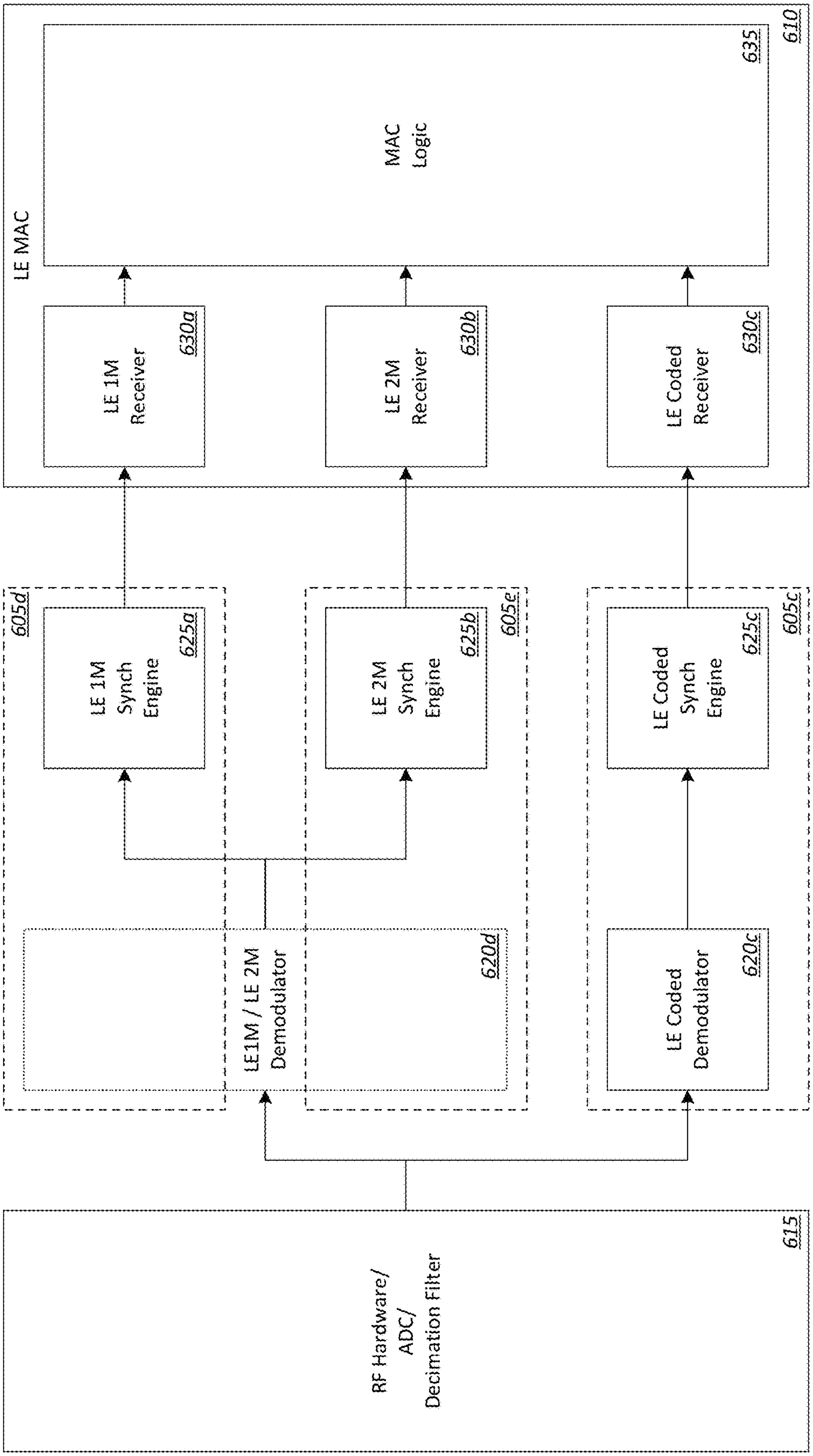
FIGS. 6H-6J are block diagrams illustrating alternative configurations of a Bluetooth device in accordance with various embodiments.
Figure 6I:
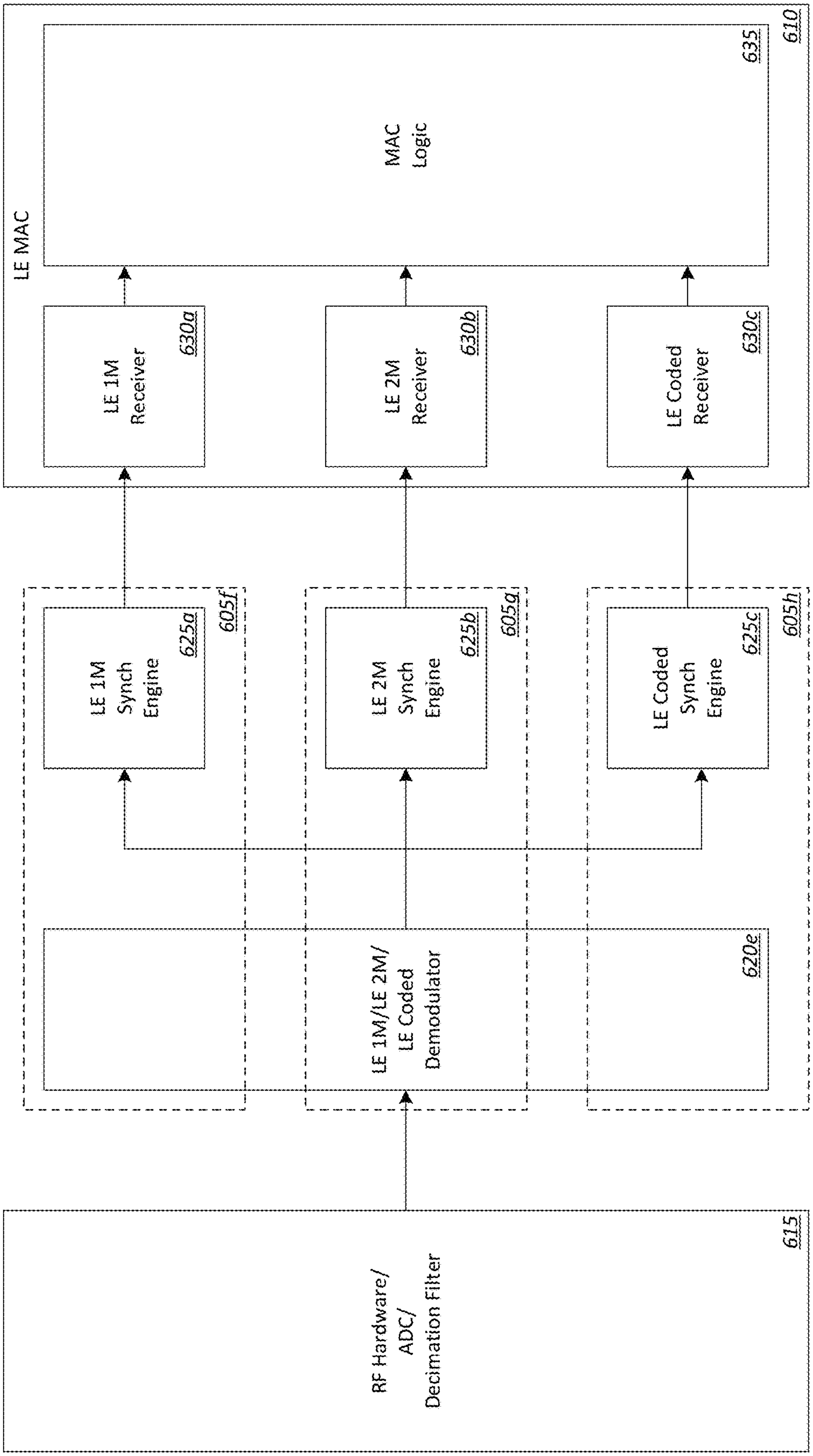
Figure 6J:
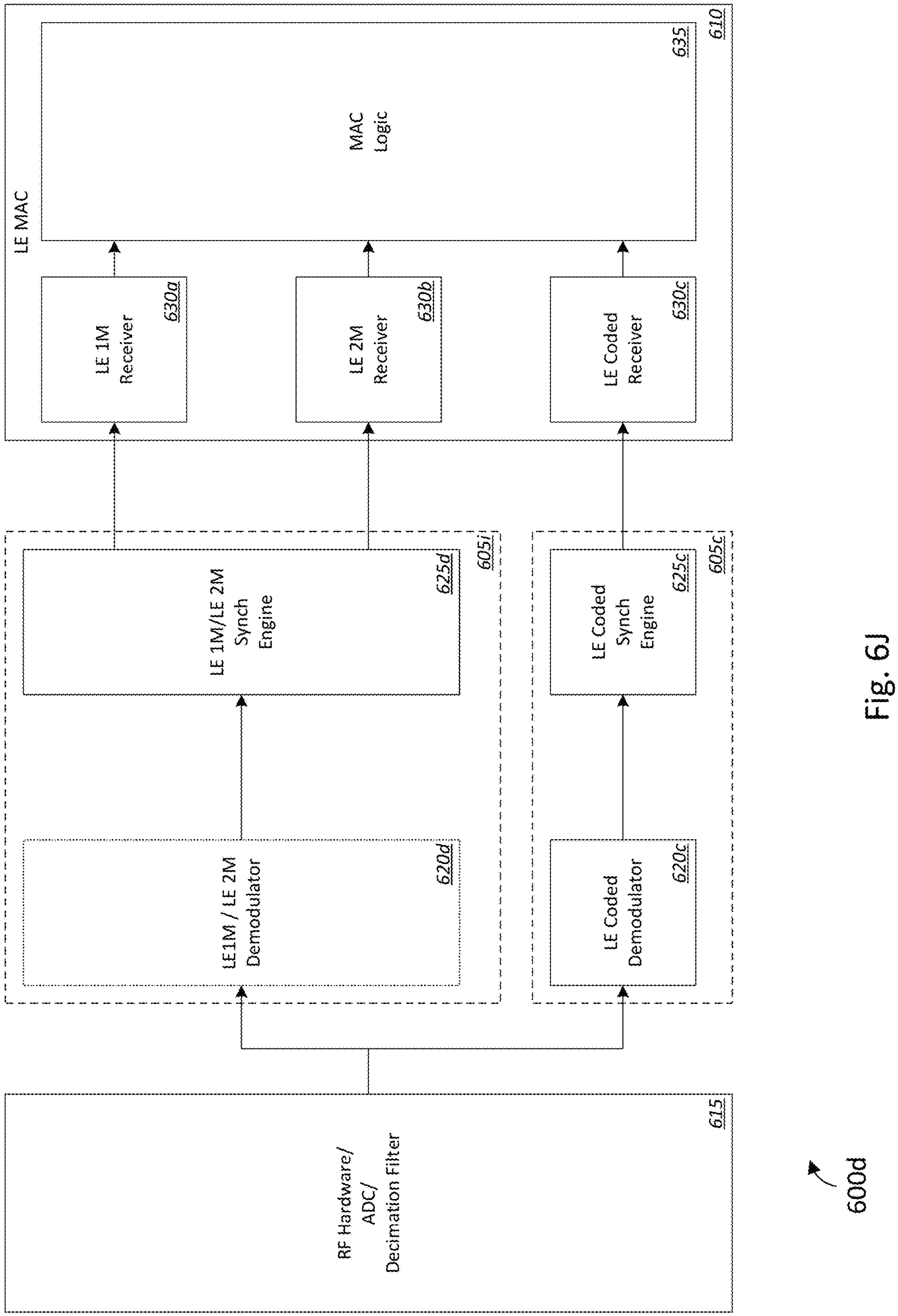

An automatic PHY update process in accordance with some embodiments can be described in the context of FIGS. 6A-J. FIG. 6A is a block diagram illustrating exemplary physical and/or logical components of a Bluetooth device capable of automatic PHY updates in accordance with various embodiments, and FIGS. 6B-6G are block diagrams illustrating the operation of a such a device in accordance with various embodiments. FIGS. 6H-6J illustrate alternative configurations of such a device.

FIG. 6A illustrates relevant components of a Bluetooth device 600*a*, which includes a plurality of physical layer blocks 605, each configured with a particular PHY, along with a MAC block 610 and RF hardware 615 (which, as illustrated, can include an analog/digital converter ADC and/or decimation filter in some embodiments, as well as any other hardware or firmware used to receive or transmit a modulated Bluetooth signal).

As used herein the term "physical layer block" means any collection of components that collectively enable or facilitate transmission or reception of a Bluetooth packet with a particular PHY (i.e., physical layer configuration, such as LE 1M, LE 2M, LE Coded, etc.). In some embodiments, a physical layer block 605 can include a demodulator 620 and/or a synchronization engine 625. Physical layer blocks 605 are merely exemplary, and physical layer blocks 605 in other embodiments might include only a single component (e.g., demodulator 620 or synchronization engine 625) and/or might include other components (e.g., ADC/filter 615, etc.). Further, while FIG. 6A illustrates three physical layer blocks 605, different embodiments can include any number of physical layer blocks, e.g., each corresponding to a different PHY supported by the device 600*a*. Similarly, while FIG. 6A illustrates physical layer blocks for some exemplary PHYs, various embodiments can include physical layer blocks 605 for any sort of PHY. In a general sense, a physical layer block 605 might comprise some or all of the components in a transmit and/or receive path between the MAC block 610 and/or logical transmitter/receivers (e.g., receivers 630) and the RF hardware 615 that physically transmits/receives packets over the air.

A demodulator 620 can be any component, which can include circuitry (e.g., hardware and/or firmware) or a processor (e.g., DSP, firmware, etc.) operating software, having logic to demodulate a modulated Bluetooth signal, and in particular embodiments a digital signal modulated onto a carrier wave using a modulation scheme. Exemplary modulation schemes include, but are not limited to, frequency shift keying (FSK) (e.g., gaussian frequency sift keying (GFSK)), quadrature amplitude modulation (QAM), and/or the like.

A synchronization engine 625 can be any component, which can include circuitry (e.g., hardware and/or firmware) or a processor (e.g., DSP, firmware, etc.) operating software, having logic to receive a signal (e.g., demodulated symbols from a demodulator 620) and detect a presence of a packet in that signal. In some embodiments, the synchronization engine 625 might include logic to detect a Bluetooth packet identifier, which can be any code, number, string, or other data that serves to identify a packet as a Bluetooth packet or PDU, including in particular a BLE packet, such as a LE 1M packet, a LE 2M packet, and/or a LE Coded packet, to name a few examples. Some exemplary packet identifiers include, but are not limited to, the packet identifiers defined by the BCS, including without limitation, access addresses, channel access codes, device access codes, sync words, and/or the like. In some embodiments, the synchronization engine 625 might perform one or more additional functions, such as delivering a detected packet to a receiver, performing operations to synchronize the device 600*a* with another device, and/or the like.

As illustrated, the exemplary device 600*a* includes three physical layer blocks: a block configured with a LE 1M PHY 605*a*, a block configured with a LE 2M PHY 605*b*, and a block configured with a LE Coded PHY 605*c*. Each of the physical layer blocks is in communication with a corresponding receiver 630. As used herein, the term "receiver" does not necessarily require the entire receive chain of the device 600*a* but instead can mean a component in the MAC block such as a packet decoder, receive payload bit processor, and/or any component or device that can receive a demodulated packet or PDU, and/or perform one or more functions including, without limitation, packet format matching, flow control checking, acknowledgement checking, decryption, authentication, and/or cyclic redundancy check (CRC) integrity checking; in some cases, the receiver receives a packet from the PHY block and provides at least a portion of the data in the packet or PDU to a higher-level component, such as the MAC logic 635. In an aspect, each receiver includes logic to receive a demodulated packet having the appropriate PHY (e.g., LE 1M receiver 630*a* includes logic to receive a LE 1M packet from physical block 605*a*, LE 2M receiver 630*b* includes logic to receive a LE 2M packet from physical block 605*b*, and LE Coded receiver 630*c* includes logic to receive a LE Coded packet from physical block 605*c*). Each receiver 630 also includes logic to provide data from the received packet to the MAC logic 635, which can take whatever action is appropriate for the packet (e.g., pass a data PDU through the Host Controller Interface (HCI) to higher layers of the Bluetooth stack, respond to control PDUs at the link layer when appropriate, etc.

FIGS. 6B-6G illustrate some embodiments of the device 600*a* in operation. While the arrows with dashed lines in FIG. 6A illustrate possible communication links according to some embodiments, the arrows with solid lines in FIGS. 6B-6G illustrate a communication path taken by, e.g., a Bluetooth LE packet during various embodiments of a PHY update procedure. As shown in FIG. 6B, the RF hardware 615 passes the same modulated packet to each of the demodulators 620, which can operate in parallel. The demodulators 620*a*, 620*b*, 620*c* each demodulate (and/or attempt to demodulate) the packet (which, at this point, might comprise demodulated symbols) and forward it to the synchronization engine 625*a*, 625*b*, 625*c*, respectively. (In different embodiments, the RF hardware 615 and/or intervening components might perform this operation in a variety of ways. Merely by way of example, the device 600*a* might include a circuit (not shown) in the path between the RF hardware 615 and the demodulators 620 to multiplex the packet to all of the demodulators 620, a bus to distribute the packet to the demodulators 620, which access the packet from the bus, etc. Each synchronization engine 625 attempts to identify a packet in the information transmitted from the respective demodulator 620. In an aspect, if the packet corresponds to the PHY of that synchronization engine 625 and/or that physical layer block 605 (e.g., a LE 2M packet corresponds to a LE 2M PHY), the synchronization engine 625 will be able to identify the packet and determine that the packet corresponds to the PHY implemented by that synchronization engine 625 (and/or physical layer block 605). If so, the synchronization engine 625 can pass the packet to the appropriate receiver 630.

To illustrate, in FIG. 6B, the RF hardware 615 receives an incoming LE 1M packet i.e., a packet transmitted by a remote device with a LE 1M PHY. As used herein, the term "remote device" simply means a device that has transmitted a packet (PDU) that has been received by the device depicted in FIGS. 6A-6G. When a packet is described herein with reference to a particular PHY (e.g., LE 1M packet, LE 2M packet, LE Coded packet, etc.) that means that the packet had been transmitted with that particular PHY (e.g., modulated using that PHY by the remote device for transmission). Each of the demodulators 620 receives this packet from the RF hardware 615. The LE 1M demodulator 620*a* demodulates the packet and passes the demodulated packet to the LE 1M synchronization engine 625*a*, while the LE 2M demodulator 620*b* demodulates the packet and passes it to the LE 2M synchronization engine 625*b*, and the LE Coded demodulator 620*c* demodulates the packet and passes it to the LE Coded synchronization engine 625*c*. As will be appreciated, the demodulated packet might comprise the symbols representing the information in the packet, which have been demodulated by the demodulator(s) 620.

Because, in this example, the packet is a LE 1M packet and thus corresponds to the LE 1M synchronization engine 625*a*, only the LE 1M synchronization engine 625*a* detects the packet. That synchronization engine 625*a* passes the packet to the LE 1M receiver 630*a*, which processes the packet and passes the result to the MAC logic 635. Meanwhile, the other two synchronization engines 625*b*, 625*c* fail to detect a packet and so transmit nothing to their respective receivers 630*b*, 630*c*.

Turning to FIG. 6C, according to the automatic PHY switching of certain embodiments, the MAC logic 635 determines that the packet is a LE 1M packet, and therefore that transmitting (remote) device is using the LE 1M PHY. This determination can be made based on messaging from the synchronization engine 625*a*, the receiver 620*a*, and/or any other component. Alternatively and/or additionally, the MAC logic 635 might simply detect that the packet was received at the LE 1M receiver 630*a* and from that detection infer that the packet is a LE 1M packet. At this point, the MAC logic 635 might automatically switch the device 600*a* (and/or the link layer of the device 600*a*) from whatever PHY was being used previously by the device 600*a* to the LE 1M PHY. In some embodiments, the LE 2M receiver 630*b* and the LE Coded receiver 630*c* will be disabled (e.g., by the MAC logic 625 and/or other logic)—this is shown on FIG. 6C by the gray shading on those two receivers 630*b*, 630*c*. In some embodiments, once the PHY has been decided, subsequent operations will follow the LE 1M path as if the PHY had been known a priori. For example, the device 600*a* might receive subsequent incoming packets using the physical layer block 605*a* implementing the LE 1M PHY. In some cases, setting the PHY to LE 1M will also cause the transmit chain (not shown) of the device 600*a* to use the LE 1M PHY to transmit one or more outgoing packets.

FIGS. 6D and 6E illustrate the same functionality, but in that case, the RF hardware 615 receives a LE 2M packet, which is detected by the LE 2M synchronization engine 625*b* and passed to the LE 2M receiver 630*b*. As a result of an automatic PHY update to LE 2M, the LE 1M receiver 630*a* and LE Coded receiver 630*c* are disabled (as shown in FIG. 6E), and the device 600*a* might receive subsequent incoming packets using the physical layer block 605*b* implementing the LE 2M PHY. Similarly, logic might cause the transmit chain (not shown) of the device 600*a* to use the LE 2M PHY to transmit one or more outgoing packets. The same process occurs in FIGS. 6F and 6G, but with the PHY automatically switching to the LE Coded PHY upon detection of a LE Coded packet at the LE Coded synchronization engine 625*c*.

The processes illustrated by FIGS. 6B-6G can be repeated as needed each time the device 600*a* receives an incoming packet with a different PHY than prior packets. For example, after a packet has been transmitted with the new PHY, all of the receivers 630 might be enabled, and the process can start again with the next incoming packet. If the new incoming packet has the same PHY, the device might not need to update the PHY and might just receive it on the same PHY as before. If the new incoming packet has a new PHY, the update process can occur.

As illustrated by the examples of FIG. 6H-6J a device 600 can employ many different configurations without departing from the scope of various embodiments. Merely by way of example, in some embodiments illustrated by FIG. 6H, the LE 1M demodulator and the LE 2M demodulator can be combined into a single demodulator 620*d*, which then can pass packets (e.g., demodulated symbols) to both the LE 1m synchronization engine 625*a* and LE 2M synchronization engine 625. In some cases, one, both, or neither of the LE 1M physical layer block 625*d* and the LE 2M physical layer block 625*e* might include the demodulator 620*b*. Other than architectural difference, the device 600*b* might operate in a similar way to the device 600A of FIGS. 6B-6G. Likewise, as illustrated by FIG. 6I, a device 600*c* might have only one demodulator 620*e* to handle all incoming packets; this device can operate in a similar fashion to device 600*a* as well. In such embodiments, one, some, all, or none of the physical layer blocks 605*f*, 605*g*, 605*h* might include the demodulator 620*e*. In other embodiments, as illustrated by FIG. 6J, the LE 1M and LE 2M synchronization engines might be combined into a single synchronization engine 625*d*, which can detect both LE 1M and LE 2M packets. The single synchronization engine 625*d* can pass a packet to the LE 1M receiver 630*a* or the LE 2M receiver, depending on which type of packet it detects. In this case, there might be a single combined physical layer block 605*i* to include the either the demodulator 620*d* and/or the synchronization engine 620*d* (or both, or neither) for both the LE 1M PHY and the LE 2M PHY.

Figure 7A:
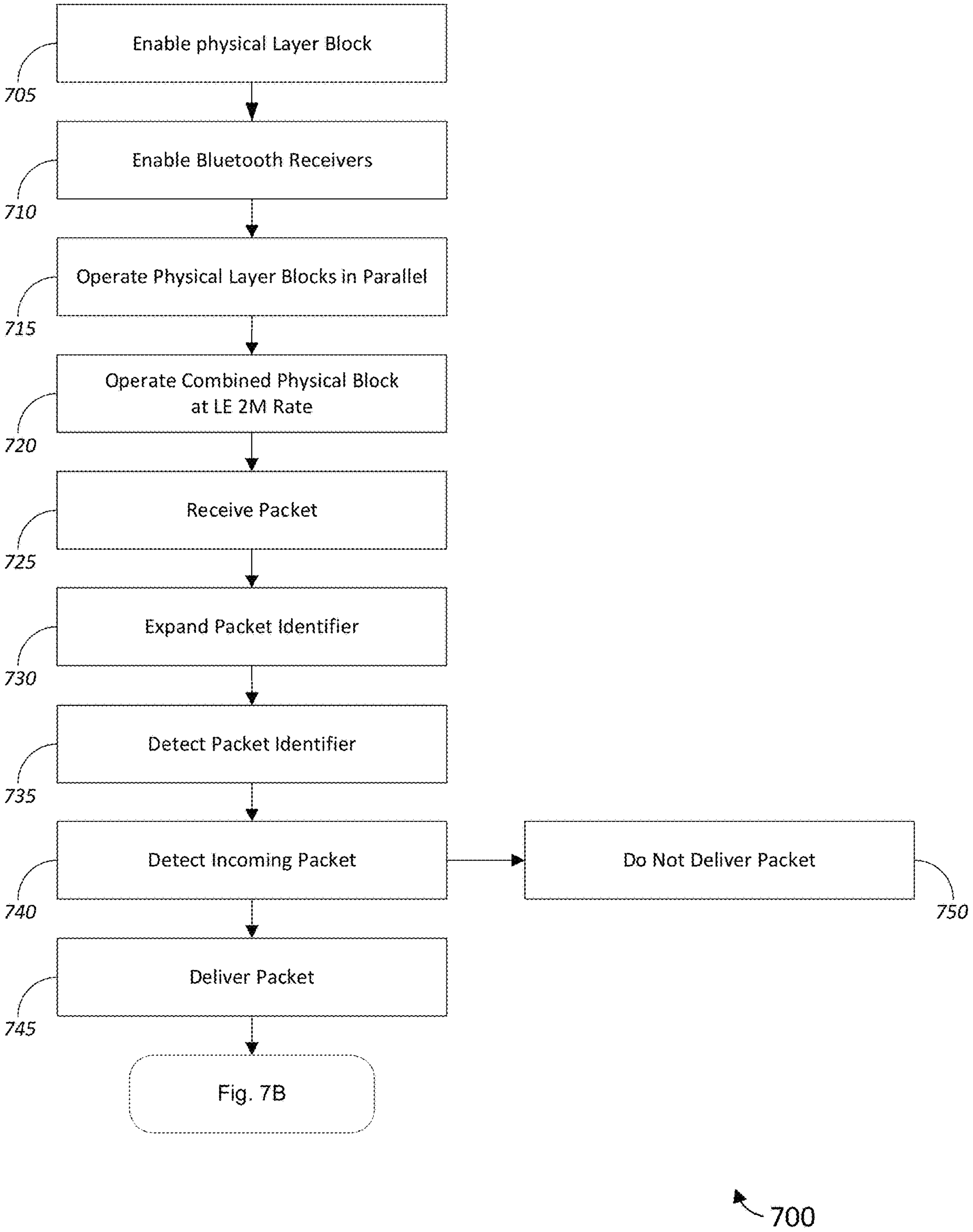
FIGS. 7A-7B illustrate a method of updating a PHY in accordance with various embodiments.
Figure 7B:
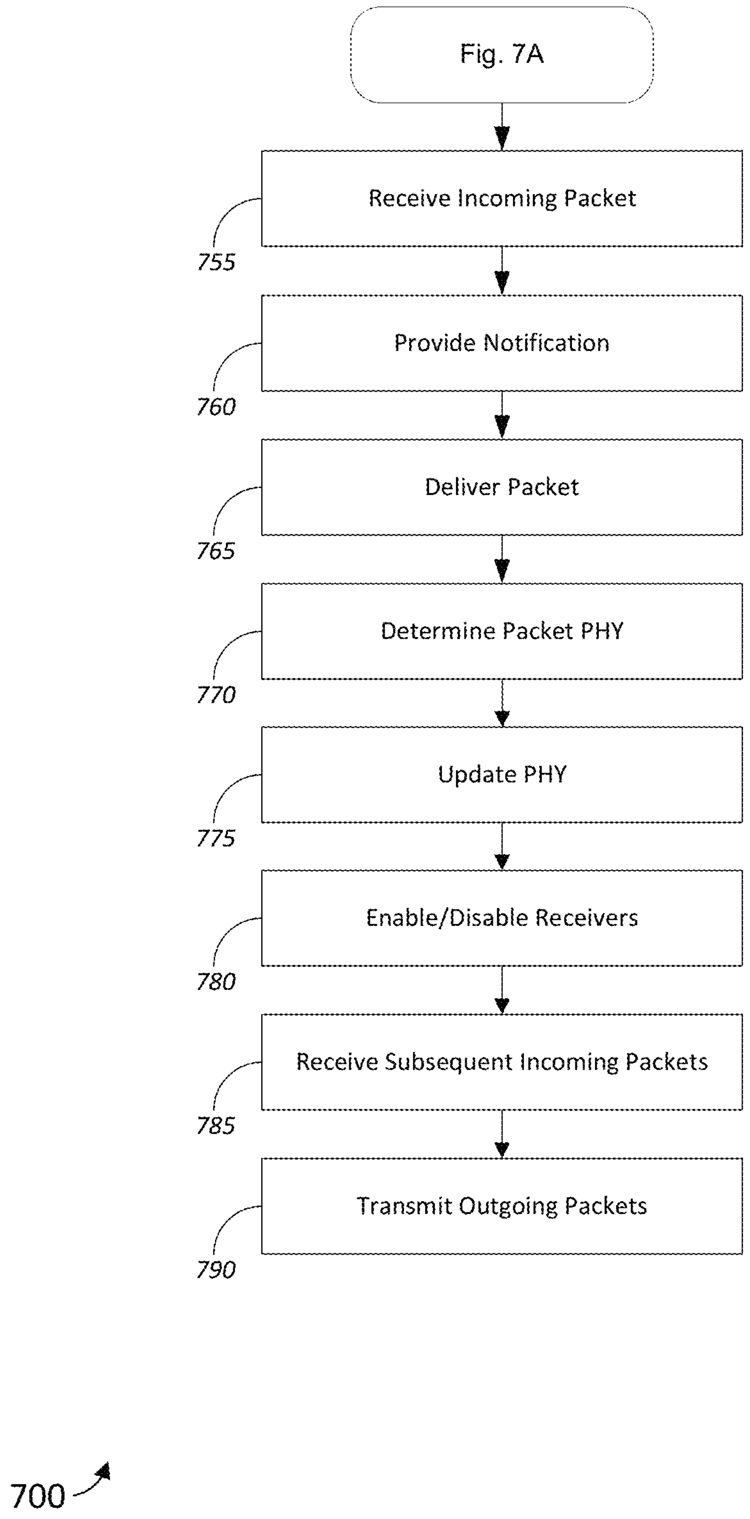

FIGS. 7A-7B illustrate in further detail a PHY update method 700 in accordance with various embodiments. While FIGS. 7A and 7B are described by reference to the devices 600*a*-600*d* of FIGS. 6A-J, those devices can operate in many different ways (including but not limited to the embodiments illustrated by FIGS. 7A and 7B). Likewise, although the operations of FIG. 7A are executed by logic in the devices 600 in some embodiments, those operations are not limited to any particular hardware, firmware, or software architecture.

Beginning with FIG. 7A, the method 700 might comprise enabling one or more physical layer blocks (block 705). For example, a device 600 might include logic (including but not limited to the MAC logic 635) that enables some or all of the physical layer blocks 605. Similarly, the method 700 might comprise enabling one or more Bluetooth receivers (block 710). For instance, a device 600 might include logic (including but not limited to the MAC logic 635) that enables some or all of the receivers 630.

In some embodiments, the method 700 might comprise operating two or more physical layer blocks, e.g., 605 in parallel (block 715). Merely by way of example, a device, e.g., 600 (or various components) might include logic to operate physical layer blocks in parallel so that each of a plurality of synchronization engines, e.g., 625 can detect (or attempt) to detect a packet in parallel. As noted, in some embodiments, a device, e.g., 600*d* might include a single, combined physical layer block, e.g., 605*i* (or components thereof, such a combined demodulator 620*d*, e.g., and/or combined synchronization engine, e.g., 625) that supports both the LE 1M PHY and the LE 2M PHY. In an aspect, therefore, the method 700 can include operating a combined physical layer block, e.g., 605*i*, and/or synchronization engine, e.g., 625*d*, at a constant rate (block 720), for example, the LE 2M rate (2 Ms/s).

At block 725, the method 700 can include receiving an incoming Bluetooth packet. The packet can be received by a local device, e.g., 600, and might be transmitted from a remote device. In some embodiments, the incoming packet can be received with RF hardware, e.g., 615, and delivered to one or more physical layer blocks, e.g., 605, where it can be demodulated and provided to one or more synchronization engines, e.g., 625 for detection.

The remote device might have used a particular PHY (e.g., LE 2M PHY) to modulate and/or transmit the packet, so the packet will be, e.g., a LE 2M packet. As noted above, a LE 2M synchronization engine, e.g., 625*b* (or a combined LE 1M/LE 2M synchronization engine, e.g., 625*d*) can detect such a packet in certain embodiments. In a set of embodiments, detecting a packet can comprise any action(s) that enable a device (or a component thereof, such as a synchronization engine) to identify a usable, receivable, and/or decodable incoming packet with a particular physical layer block. A procedure for detecting a packet using a packet identifier, in accordance with some embodiments, is described in detail below in the context of blocks 730-735.

One well-known purpose of a packet identifier (such a Bluetooth access code and/or a synch word therein, or a BLE access address, to name a few examples) is to serve as a correlation code for two communicating Bluetooth devices. For instance, a Bluetooth device, e.g., 600, generally needs to be able to distinguish between a variety of signals in the 2.4 GHz industrial, scientific, and medical (ISM) band. Such signals can include Bluetooth packets intended for the local device, e.g., 600; Bluetooth packets intended for another device; packets used by other wireless communications technologies (e.g., Wi-Fi) operating on frequencies in the ISM band that interfere with the current Bluetooth channel; and background noise, to name a few. In an aspect of some embodiments, sync words and access addresses are designed to be correlated (i.e., pattern matched) quickly when a packet is decoded, in order to distinguish valid packets (i.e., Bluetooth packets intended for the local device) from other signals.

In some cases, for example, when a combined synchronization engine, e.g., 625*d*, is used to detect both LE 1M and LE 2M packets, it might operate at the LE 2M rate; thus, it can be desirable to expand the packet identifier of a LE 1M packet, e.g., to account for the increased rate of operation over a typical LE 1M correlator. Merely by way of example, in some cases, the LE 1M packet identifier might be doubled in size. In a particular embodiment, this expansion can be accomplished by a bitwise repeating operation. For example, a 32-bit packet identifier of 0x9AF20739 could be expanded to the 64-bit identifier 0xC3CCFF0C003F0FC3. Thus, in some embodiments, when correlating a LE 1M packet identifier, the LE 1M/LE 2M synchronization engine would run correlation at the LE 2M rate with a 64-bit identifier length.

The method 700 thus can include expanding the packet identifier (block 730), if appropriate, and detecting the packet identifier block 735. In an aspect, a synchronization engine might include a correlator or other circuitry to correlate the packet identifier from the packet, and the detecting a packet identifier therefore can include correlating the packet identifier Embodiments are not limited to detecting packet identifiers by correlation, however.

At block 720, the method 700 can include detecting an incoming packet. In some embodiments detecting (e.g., correlating) a packet identifier can serve to detect the packet, but other embodiments can use any other suitable procedure (s) to detect a packet, and in particular a packet having the same PHY as the detecting synchronization engine. If the packet is detected, the method 700 can comprise delivering the packet (block 745), e.g., to an appropriate receiver as described above. If not, no packet is delivered (block 750). In some cases, not delivering a packet might comprise a specific action, such as blocking or discarding the packet, but this is not required. Taking FIGS. 6B and 6C (in which the incoming packet is a LE 1M packet), as an example, the LE 1M synchronization engine 625*a* detects the LE 1M packet and delivers that packet to the LE 1M receiver 630*a*. On the other hand, the LE Coded synchronization engine 625*c* cannot detect the packet, so it would not deliver the packet to the LE Coded receiver 630*c*.

The physical layer block, e.g., 605 and/or synchronization engine, e.g., 625 might perform any other necessary actions before delivering an incoming packet. Such actions can include demodulating and/or decoding the packet, removing certain header or trailer fields, and/or the like. Thus, the delivered packet might not have the same form as the packet received by the physical layer block, e.g., 605 and/or synchronization engine, e.g., 625.

Turning to FIG. 7B, the method 700 can include, at block 755 receiving the incoming packet (in whatever form) at a receiver, e.g., 630. As noted above, in some embodiments, the packet might be delivered by or from a physical layer block, e.g., 605 and/or synchronization engine, e.g., 625, at a receiver that implements the PHY of the incoming packet (block 755). In the example of FIGS. 6B and 6C, the LE 1M receiver 630*a* might receive the packet. The method 700 can further comprise providing notice of the received packet (block 760).

In some embodiments, the receiver, e.g., 630*a* (to continue the above example), might provide a notification that the packet was originally transmitted using a particular PHY, e.g., a LE 1M PHY. In other embodiments, a different component, such as a physical layer block, e.g., 605*a*, a synchronization engine, e.g., 625*a*, etc., might provide such notification. For instance, in a particular set of embodiments, a receiver, e.g., 630*a*, might provide a notification (e.g., to MAC logic, e.g., 635) by delivering at least a portion of the incoming packet. For example, in some embodiments, if the MAC logic 635 is configured to recognize that a receiver, e.g., 630*a* can process only LE 1M packets, and the MAC logic receives at least a portion of the packet from that receiver, the MAC logic can infer that the packet is a LE 1M packet. In other cases, other notifications are possible, such as out-of-band notifications from a receiver, synchronization engine, or any other suitable component.

At block 770, the method 700 includes determining that the incoming Bluetooth packet corresponds to a particular Bluetooth PHY. In some cases, this determination is made based on a notification, e.g., the notification described in connection with block 765. In other embodiments, however, such a determination requires no notification. In various embodiments, the device, e.g., 600, can include logic (e.g., circuitry) to make this determination in a variety of ways.

At block 775, the method can comprise updating the PHY of the device, e.g., 600, to match the PHY of the incoming packet, for example as explained above. In the example of FIGS. 6B and 6C, this would be the LE 1M PHY. In an aspect of some embodiments, updating the PHY can comprise setting the PHY of the incoming packet as the active PHY for receiving and/or transmitting packets with the device and/or components thereof.

Merely by way of example, at block 780, the method 700 (and/or updating the PHY) might comprise enabling the receiver that received the packet (i.e., in the example of FIGS. 6B and 6C, receiver 630*a*, which implements the LE 1M PHY), while disabling all other receivers (e.g., receivers 630*b* and 630*c* in the example of FIGS. 6B and 6C). In some embodiments, of course, the receiver that received the packet might already be enabled, so enabling that receiver might simply comprise leaving that receiver enabled while disabling the others. In an aspect, disabling the other receivers (e.g., 630*b* and 630*c*) might simply mean setting those receivers in a standby or low-power mode. Moreover, in some cases, as noted above, when the next incoming packet arrives, those receivers might be re-enabled until the synchronization engines stop (e.g., either passing the packet to the respective receiver, which stays enabled, or failing to synchronize, in which case the respective receiver receives no packet and is disabled again).

The method 700 (and/or updating the PHY) might also include receiving subsequent incoming packets with the enabled receiver (block 770), i.e., the receiver that implements the updated PHY, receiver 630*a* in the example of FIGS. 6B and 6C. In some embodiments, updating the PHY can include transmitting one or more outgoing Bluetooth packets using the updated PHY (e.g., the LE 1M PHY in the example of FIGS. 6B and 6C).

Figure 8:
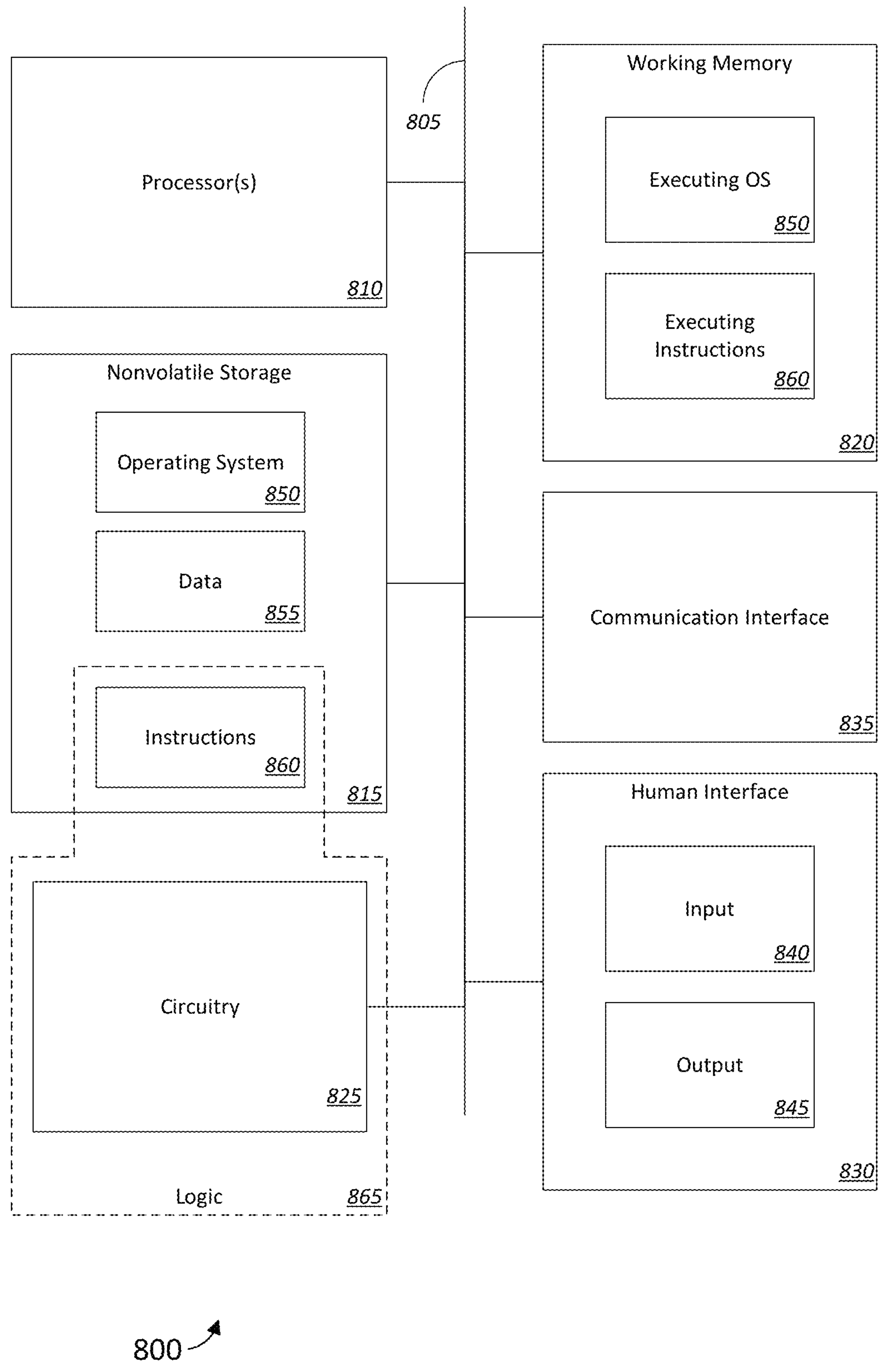
FIG. 8 is a block diagram illustrating example components of a device in accordance with some embodiments.

FIG. 8 is a block diagram illustrating an example of a device 800, which can function as described herein, including without limitation serving as a Bluetooth device, a Bluetooth user device, a Bluetooth subsystem of a Bluetooth user device, a computer system (or a component of any of these) in accordance with various embodiments, and/or performing some or all operations of the methods described herein. No component shown in FIG. 8 should be considered necessary or required by each embodiment. For example, many embodiments may not include a processor and/or might be implemented entirely in hardware or firmware circuitry. Similarly, many embodiments may not include input devices, output devices, or network interfaces.

With that prelude, as shown in FIG. 8, the device 800 may include a bus 805. The bus 805 includes one or more components that enable wired and/or wireless communication among the components of the device 800. The bus 805 may couple together two or more components of FIG. 8, such as via operative coupling, communicative coupling, electronic coupling, and/or electric coupling. Such components can include a processor 810 non-volatile storage 815, working memory (e.g., system dynamic random-access memory (DRAM)) 820, and/or circuitry 825. In some cases, the system 800 can include human interface components 830 and/or a communication interface 835.

While these components are displayed as integrated within the device 800, some embodiments might feature certain components located external from the device 800. As such, the device 800 might include, instead of or in addition to the components themselves, facilities for communicating with such external devices, which therefore can be considered part of the device 800 in some embodiments.

Merely by way of example, the non-volatile storage 815 can include a hard disk drive (HDD), a solid-state drive (SSD), and/or any other form of persistent storage (i.e., storage that does not require power to maintain the state of the stored data). While such storage often is incorporated within the device 800 itself, such storage might be external to the device 800 and can include external HDD, SSD, flash drives, or the like, as well as networked storage (e.g., shared storage on a file server, etc.), storage on a storage area network (SAN), cloud-based storage, and/or the like. Unless the context dictates otherwise, any such storage can be considered part of the device 800 in accordance with various embodiments.

Similarly, the human interface 830 can include input components 840 and/or output components 845, which can be disposed within the device 800, external to the device 800, and/or combinations thereof. The input components 840 can enable the device 800 to receive input, such as user input and/or sensed input. For example, the input components 840 may include a touch screen, a keyboard, a keypad, a mouse, a button, a microphone, a switch, a sensor, a global positioning system sensor, an accelerometer, a gyroscope, and/or an actuator. In some cases, such components can be external to the device 800 and/or can communicate with components internal to the device 88, such as input jacks, USB ports, Bluetooth radios, and/or the like. Similarly, the output component 845 can enable the device 800 to provide output, such as via a display, a printer, a speaker, and/or the like, any of which can be internal to the device 800 and/or external to the device but in communication with internal components, such as a USB port, a Bluetooth radio, a video port, and/or the like. Again, unless the context dictates otherwise, any such components can be considered part of the device 800 in accordance with various embodiments.

From these examples, it should be appreciated that various embodiments can support various arrangements of external and/or internal components, all of which can be considered part of the device 800. In certain embodiments, some or all of these components might be virtualized; examples can include virtual machines, containers (such as Docker containers, etc.), cloud computing environments, platform as a service (PAAS) environment, and/or the like.

In an aspect, the nonvolatile storage 815 can be considered and/or can include a non-transitory computer readable medium. In some embodiments, the nonvolatile storage 815 can be used to store software and/or data for use by the device 800. Such software/data can include an operating system 850, data 855, and/or instructions 860. The operating system can include instructions governing the basic operation of the device 800 and can include a variety of personal computer or server operating systems, embedded operating systems, and/or the like, depending on the nature of the device 800. The data 855 can include any of a variety of data used or produced by the device 800 (and/or the operation thereof), such as media content, databases, documents, and/or the like. The instructions 860 can include software code, such as applications, object code, assembly, binary, etc.) used to program the processor 810 to perform operations in accordance with various embodiments. In an aspect, the operating system 850 can be considered part of the instructions 860 in some embodiments.

The processor 810 can include one or more of a central processing unit, a graphics processing unit, a microprocessor, a controller, a microcontroller, a digital signal processor (DSP), programmable logic (such as a field-programmable gate array (FPGA) an erasable programmable logic device (EPLD), or the like), an application-specific integrated circuit (ASIC), a system on a chip (SoC) and/or another type of processing component. The processor 810 can be implemented in hardware, firmware, or a combination of hardware, firmware and/or software. In some implementations, the processor 810 includes one or more processors capable of being programmed to perform one or more operations or processes described elsewhere herein.

For example, in some embodiments, the device 800 can comprise logic 865. Such logic can be any sort of code, instructions, circuitry, or the like that can cause the device 800 to operate in accordance with the embodiments herein (e.g., to perform some or all of the processes and/or operations described herein). Merely by way of example, the logic 88 can include the instructions 860, which might be stored on the nonvolatile storage 815 as noted above, loaded into working memory 820, and/or executed by the processor 810 to perform operations and methods in accordance with various embodiments. In an aspect, these instructions 860 can be considered to be programming the processor 810 to operate according to such embodiments. In the same way, the operating system 850 (to the extent it is discrete from the instructions 860) might be stored on the nonvolatile storage 815, loaded into working memory 820, and/or executed by a processor 810.

Alternatively, and/or additionally, logic can include the circuitry 825 (e.g., hardware or firmware), which can operate independently of, or collaboratively with, any processor 810 the device 800 might or might not have. (As noted above, in some cases, the circuitry 850 itself can be considered a processor 810.) The circuitry 825 might be embodied by a chip, SoC, ASIC, programmable logic device (FPGA, EPLD, etc.), and/or the like. Thus, some or all of the logic enabling or causing the performance of some or all of the operations described herein might be encoded in hardware or firmware circuitry (e.g., circuitry 850) and executed directly by such circuitry, rather than being software instructions 860 loaded into working memory 820. (In some cases, this functionality can be embodied by hardware instructions). Thus, unless the context dictates otherwise, embodiments described herein are not limited to any specific combination of hardware, firmware, and/or software.

The device 800 can also include a communication interface 835, which can enable the device 800 to communicate with other devices via a wired (e.g., electrical and/or optical) connection and/or a wireless (RF) connection. For example, the communication interface 860 may include one or more RF systems (such a Bluetooth system, a Wi-Fi system, a 5G or cellular system, etc.). Some such systems can be implemented in combination, as discrete chips, as SoCs, and/or the like. The communication interface 835 can further include a modem, a network interface card, and/or an antenna. In some cases, the communication interface 830 might comprise a plurality of I/O ports, each of which can be any facility that provides communication between the device 800 and other devices; in particular embodiments, such ports can network ports, such as Ethernet ports, fiber ports, etc. Other embodiments can include different types of I/O ports, such as serial ports, pinouts, and/or the like. Depending on the nature of the device 800, the communication interface 835 can include any standard or proprietary components to allow communication as described in accordance with various embodiments.

One set of embodiments provides devices. An exemplary device might comprise one or more demodulators configured to demodulate an incoming Bluetooth packet that was transmitted using a first Bluetooth physical layer configuration (PHY). In some embodiments, the device might further comprise a plurality of synchronization engines operating in parallel. In some embodiments, each of the synchronization engines can be in communication with at least one of the one or more demodulators and/or might be configured to receive the incoming Bluetooth packet.

The plurality of synchronization engines might comprise a first synchronization engine implementing the first Bluetooth PHY. The first synchronization engine might comprise logic (e.g., circuitry) to receive the incoming Bluetooth packet from one of the demodulators, logic (e.g., circuitry) to detect a packet identifier in the incoming Bluetooth packet, e.g., based at least in part on the packet being transmitted using the first Bluetooth PHY, logic (e.g., circuitry) to detect the incoming Bluetooth packet, e.g., based on detection of the packet identifier. The first synchronization engine might further comprise logic (e.g., circuitry) to deliver the incoming Bluetooth packet, e.g., based on detecting the incoming Bluetooth packet.

The plurality of synchronization engines might further comprise a second synchronization engine implementing a second Bluetooth PHY. The second synchronization engine might comprise logic (e.g., circuitry) to receive the incoming Bluetooth packet from one of the one or more demodulators and/or logic (e.g., circuitry) not to deliver the incoming Bluetooth packet, based on a failure to detect the incoming Bluetooth packet. The plurality of synchronization engines might further comprise a third synchronization engine implementing a third Bluetooth PHY and/or logic (e.g., circuitry) not to deliver the incoming Bluetooth packet, based on a failure to detect the incoming Bluetooth packet.

In some embodiments, the plurality of synchronization engines might comprise a Bluetooth LE 1M synchronization engine, a Bluetooth LE 2M synchronization engine, and/or a Bluetooth LE Coded synchronization engine. In an aspect, the Bluetooth LE 1M synchronization engine and the Bluetooth LE 2M synchronization engine might be combined in a single, combined synchronization engine, and the combined synchronization engine might include logic (e.g., circuitry) to operate at a Bluetooth LE 2M rate. Additionally and/or alternatively, the combined synchronization includes logic (e.g., circuitry) to expand the packet identifier if the incoming packet is a Bluetooth LE 1M packet.

In some embodiments, the device might comprise a plurality of receivers. Each of the receivers might be configured to receive Bluetooth packets corresponding to a different Bluetooth PHY. The plurality of receivers might include a first receiver in communication with the first synchronization engine and configured to receive Bluetooth packets corresponding to the first Bluetooth PHY. In some embodiments, the first receiver might comprise logic (e.g., circuitry) to receive the incoming Bluetooth packet, and/or logic (e.g., circuitry) to provide notification that the incoming Bluetooth packet was transmitted (by a remote device) using the first Bluetooth PHY. In an aspect of some embodiments, the logic (e.g., circuitry) to provide this notification can comprise logic (e.g., circuitry) to deliver at least a portion of the incoming Bluetooth packet.

The plurality of receivers might include a second receiver in communication with the second synchronization engine and configured to receive Bluetooth packets corresponding to the second Bluetooth PHY and/or a third receiver in communication with the third synchronization engine and configured to receive Bluetooth packets corresponding to the third Bluetooth PHY.

In some embodiments, the device comprises logic (e.g., circuitry) to receive the notification that the incoming Bluetooth packet was transmitted (by a remote device) using the first Bluetooth PHY and/or logic (e.g., circuitry) to determine that the incoming Bluetooth packet corresponds to the first Bluetooth PHY. Merely by way of example, the device might comprise logic (e.g., circuitry) to receive the notification that the incoming Bluetooth packet was transmitted using the first PHY and logic (e.g., circuitry) to determine that the incoming Bluetooth packet corresponds to the first Bluetooth PHY, based at least in part on the notification. The device might further comprise logic (e.g., circuitry) to update the device to operate using the first Bluetooth PHY, logic (e.g., circuitry) to enable the first receiver and disable the second and third receivers, logic (e.g., circuitry) to receive one or more subsequent incoming Bluetooth packets with the first receiver, and/or logic (e.g., circuitry) to transmit one or more outgoing Bluetooth packets using the first Bluetooth PHY.

A device in accordance with other embodiments, which might—in some embodiments—be a system on a chip (SoC), a Bluetooth user device, and/or the like, might comprise logic (e.g., circuitry) to enable a plurality of physical layer blocks, and/or logic (e.g., circuitry) to operate all of the physical layer blocks in parallel. The plurality of physical layer blocks might comprise a first physical layer block implementing a first Bluetooth physical layer configuration (PHY). In some cases, the plurality of physical layer blocks comprises a physical layer block implementing a Bluetooth LE 1M PHY; a physical layer block implementing a Bluetooth LE 2M PHY, a physical layer block implementing a Bluetooth LE Coded PHY, and/or a physical layer block implementing a Bluetooth LE high data rate PHY. In some embodiments, the incoming packet might be a Bluetooth LE 2M packet comprising an advertising PDU, and the device can further comprise logic (e.g., circuitry) to receive the incoming packet on a Bluetooth primary advertising channel. In an aspect of some embodiments, the incoming packet comprises a packet identifier, and/or detecting the incoming packet might comprise detecting the packet identifier.

In some embodiments the physical layer block implementing the Bluetooth LE 1M PHY and the physical layer block implementing the Bluetooth LE 2M PHY are combined into a single Bluetooth physical layer block, and the device might comprise logic (e.g., circuitry) to operate at least a portion of the single Bluetooth physical layer block at a Bluetooth LE 2M rate. In such cases, the device might comprise logic (e.g., circuitry) to expand the packet identifier if the packet is a Bluetooth LE 1M packet, for example, logic (e.g., circuitry) to expand the packet identifier using bitwise repeating.

The device might further comprise logic (e.g., circuitry) to enable a plurality of receivers; the plurality of receivers might comprise a first receiver in communication with the first physical layer block. In some embodiments, the device might comprise logic (e.g., circuitry) to detect an incoming packet with the first physical layer block, logic (e.g., circuitry) to determine that the incoming packet corresponds to the first Bluetooth PHY, and/or logic (e.g., circuitry) to update the device to operate using the first Bluetooth PHY, e.g., based at least in part on determining that the incoming packet corresponds to the first Bluetooth PHY. In some embodiments, the device comprises logic (e.g., circuitry) to enable the first receiver and disable all other receivers; logic (e.g., circuitry) to receive one or more subsequent incoming Bluetooth packets with the first receiver; logic (e.g., circuitry) to transmit one or more outgoing Bluetooth packets using the first Bluetooth PHY.

In some embodiments, the logic (e.g., circuitry) to determine that the incoming packet corresponds to the first Bluetooth PHY comprises logic (e.g., circuitry) to deliver the incoming packet (e.g., from the first physical layer block and/or to the receiver), based at least in part on detecting the incoming packet. The logic (e.g., circuitry) to determine that the incoming packet corresponds to the first Bluetooth PHY might further comprises logic (e.g., circuitry) to receive the incoming packet with the first receiver. In some embodiments, the device might further comprise logic (e.g., circuitry) to provide notice to media access control (MAC) logic that the incoming packet corresponds to the first Bluetooth PHY, and/or the logic (e.g., circuitry) to determine that the incoming packet corresponds to the first Bluetooth PHY comprises logic (e.g., circuitry) to determine that the incoming packet corresponds to the first Bluetooth PHY based at least in part on the notice. In an aspect of certain embodiments, the logic (e.g., circuitry) to provide notice to the MAC logic comprises logic (e.g., circuitry) to deliver at least a portion of the packet to the MAC logic.

Another set of embodiments can provide methods. An exemplary method might comprise operations corresponding to some or all of the logic and/or circuitry mentioned above. Merely by way of example, a method might comprise enabling a plurality of physical layer blocks, which might comprise a first physical layer block implementing a first Bluetooth physical layer configuration (PHY). The method might further comprise enabling a plurality of receivers, which might comprise a first receiver in communication with the first physical layer block. In some embodiments, the method comprises detecting an incoming packet with the first physical layer block, determining that the incoming packet corresponds to the first Bluetooth PHY, and/or updating the device to operate using the first Bluetooth PHY, e.g., based at least in part on determining that the incoming packet corresponds to the first Bluetooth PHY.

CONCLUSION

In the foregoing description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Thus, the foregoing description provides illustration and description of some features and aspect of various embodiments, but it is not intended to be exhaustive or to limit the implementations to the precise form disclosed. One skilled in the art will recognize that modifications may be made in light of the above disclosure or may be acquired from practice of the implementations, all of which can fall within the scope of various embodiments. For example, as noted above, the methods and processes described herein may be implemented using software components, firmware and/or hardware components, (including without limitation processors, other hardware circuitry, custom integrated circuits (ICs), programmable logic, etc.) and/or any combination thereof.

Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Likewise, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods does not limit the implementations unless specifically recited in the claims below. Thus, when the operation and behavior of the systems and/or methods are described herein without reference to specific software code, one skilled in the art would understand that software and hardware can be used to implement the systems and/or methods based on the description herein.

In this disclosure, when an element is referred to herein as being “connected” or “coupled” to another element, it is to be understood that one element can be directly connected to the other element or have intervening elements present between the elements. In contrast, when an element is referred to as being “directly connected” or “directly coupled” to another element, it should be understood that no intervening elements are present in the “direct” connection between the elements. However, the existence of a direct connection does not preclude other connections, in which intervening elements may be present. Similarly, while the methods and processes described herein may be described in a particular order for ease of description, it should be understood that, unless the context dictates otherwise, intervening processes may take place before and/or after any portion of the described process, and, as noted above, described procedures may be reordered, added, and/or omitted in accordance with various embodiments.

In this application, the use of the singular includes the plural unless specifically stated otherwise, and use of the term "and" means "and/or" unless otherwise indicated. Also, as used herein, the term "or" is intended to be inclusive when used in a series and also may be used interchangeably with "and/or," unless explicitly stated otherwise (e.g., if used in combination with "either" or "only one of"). Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Unless otherwise indicated, all numbers used herein to express quantities, dimensions, and so forth should be understood as being modified in all instances by the term "about." As used herein, the articles "a" and "an" are intended to include one or more items and may be used interchangeably with "one or more." Similarly, as used herein, the article "the" is intended to include one or more items referenced in connection with the article "the" and may be used interchangeably with "the one or more." As used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. In the foregoing description, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Thus, while each dependent claim listed below may directly depend on only one claim, the disclosure of various implementations includes each dependent claim in combination with every other claim in the claim set. No element, act, or instruction used herein should be construed as critical or essential unless explicitly described as such.

The invention claimed is:

1. A device, comprising:

circuitry to enable a plurality of physical layer blocks, the plurality of physical layer blocks comprising a first physical layer block implementing a first Bluetooth physical layer configuration (PHY);

circuitry to enable a plurality of receivers, the plurality of receivers comprising a first receiver in communication with the first physical layer block;

circuitry to detect an incoming packet with the first physical layer block;

circuitry to determine that the incoming packet corresponds to the first Bluetooth PHY; and circuitry to update the device to operate using the first Bluetooth PHY, based at least in part on determining that the incoming packet corresponds to the first Bluetooth PHY, the circuitry to update the device to operate using the first Bluetooth PHY comprising:

circuitry to enable the first receiver and disable all other receivers;

circuitry to receive one or more subsequent incoming Bluetooth packets with the first receiver; and circuitry to transmit one or more outgoing Bluetooth packets using the first Bluetooth PHY.

2. The device of claim 1, wherein the circuitry to determine that the incoming packet corresponds to the first Bluetooth PHY comprises circuitry to deliver the incoming packet from the first physical layer block, based at least in part on detecting the incoming packet.

3. The device of claim 2, wherein the circuitry to determine that the incoming packet corresponds to the first Bluetooth PHY further comprises circuitry to receive the incoming packet with the first receiver.

4. The device of claim 1, further comprising circuitry to provide notice to media access control (MAC) logic that the incoming packet corresponds to the first Bluetooth PHY, wherein the circuitry to determine that the incoming packet corresponds to the first Bluetooth PHY comprises circuitry to determine that the incoming packet corresponds to the first Bluetooth PHY based at least in part on the notice.

5. The device of claim 4, wherein the circuitry to provide notice to the MAC logic comprises circuitry to deliver at least a portion of the incoming packet to the MAC logic.

6. The device of claim 1, wherein the plurality of physical layer blocks comprises:

a physical layer block implementing a Bluetooth LE 1M PHY;

a physical layer block implementing a Bluetooth LE 2M PHY; and a physical layer block implementing a Bluetooth LE Coded PHY.

7. The device of claim 1, wherein:

the incoming packet comprises a packet identifier; and the circuitry to detect the incoming packet comprises circuitry to detect the packet identifier.

8. The device of claim 7, wherein the plurality of physical layer blocks comprises a physical layer block implementing a Bluetooth LE 1M PHY and a physical layer block implementing a Bluetooth LE 2M PHY, and the physical layer block implementing the Bluetooth LE 1M PHY and the physical layer block implementing the Bluetooth LE 2M PHY are combined into a single Bluetooth physical layer block.

9. The device of claim 8, further comprising circuitry to operate at least a portion of the single Bluetooth physical layer block at a Bluetooth LE 2M rate.

10. The device of claim 9, further comprising circuitry to expand the packet identifier if the incoming packet is a Bluetooth LE 1M packet.

11. The device of claim 10, further comprising circuitry to expand the packet identifier using bitwise repeating.

12. The device of claim 1, wherein the device is a system on a chip (SoC).

13. The device of claim 1, wherein the device is a Bluetooth user device.

14. The device of claim 1, wherein the incoming packet is a Bluetooth LE 2M packet comprising an advertising PDU, the device further comprising circuitry to receive the incoming packet on a Bluetooth primary advertising channel.

15. A device, comprising:

circuitry to enable a plurality of physical layer blocks, the plurality of physical layer blocks comprising a first physical layer block implementing a first Bluetooth physical layer configuration (PHY);

circuitry to enable a plurality of receivers, the plurality of receivers comprising a first receiver in communication with the first physical layer block;

circuitry to detect an incoming packet with the first physical layer block, the incoming packet being a Bluetooth LE 2M packet comprising an advertising PDU;

circuitry to receive the incoming packet on a Bluetooth primary advertising channel;

circuitry to determine that the incoming packet corresponds to the first Bluetooth PHY; and circuitry to update the device to operate using the first Bluetooth PHY, based at least in part on determining that the incoming packet corresponds to the first Bluetooth PHY.

16. The device of claim 15, wherein the circuitry to update the device to operate using the first Bluetooth PHY comprises:

circuitry to enable the first receiver and disable all other receivers;

circuitry to receive one or more subsequent incoming Bluetooth packets with the first receiver; and circuitry to transmit one or more outgoing Bluetooth packets using the first Bluetooth PHY.

17. The device of claim 15, wherein:

the incoming packet comprises a packet identifier;

the circuitry to detect the incoming packet comprises circuitry to detect the packet identifier;

a physical layer block implementing a Bluetooth LE 1M PHY and a physical layer block implementing a Bluetooth LE 2M PHY in the plurality of physical layer blocks are combined into a single Bluetooth physical layer block;

the device further comprises circuitry to operate at least a portion of the single Bluetooth physical layer block at a Bluetooth LE 2M rate; and the device further comprises circuitry to expand a packet identifier of a Bluetooth LE 1M packet.

18. A device, comprising:

circuitry to enable a plurality of physical layer blocks, the plurality of physical layer blocks comprising a first physical layer block implementing a first Bluetooth physical layer configuration (PHY), wherein a physical layer block implementing a Bluetooth LE 1M PHY and a physical layer block implementing a Bluetooth LE 2M PHY in the plurality of physical layer blocks are combined into a single Bluetooth physical layer block;

circuitry to enable a plurality of receivers, the plurality of receivers comprising a first receiver in communication with the first physical layer block;

circuitry to operate at least a portion of the single Bluetooth physical layer block at a Bluetooth LE 2M rate;

circuitry to detect an incoming packet with the first physical layer block, the incoming packet comprising a packet identifier, the circuitry to detect the incoming packet comprising circuitry to detect the packet identifier;

circuitry to expand a packet identifier of a Bluetooth LE 1M packet;

circuitry to determine that the incoming packet corresponds to the first Bluetooth PHY; and circuitry to update the device to operate using the first Bluetooth PHY, based at least in part on determining that the incoming packet corresponds to the first Bluetooth PHY.

19. The device of claim 18, wherein the circuitry to update the device to operate using the first Bluetooth PHY comprises:

circuitry to enable the first receiver and disable all other receivers;

circuitry to receive one or more subsequent incoming Bluetooth packets with the first receiver; and circuitry to transmit one or more outgoing Bluetooth packets using the first Bluetooth PHY.

20. The device of claim 18, wherein the incoming packet is a Bluetooth LE 2M packet comprising an advertising PDU, the device further comprising circuitry to receive the incoming packet on a Bluetooth primary advertising channel.

* * * * *